US012254307B2

(12) United States Patent
Satoh

(10) Patent No.: US 12,254,307 B2
(45) Date of Patent: Mar. 18, 2025

(54) INFORMATION PROCESSING APPARATUS, INFORMATION PROCESSING METHOD, AND INFORMATION PROCESSING SYSTEM TO ENABLE SOFTWARE PROGRAM TO BE EASILY UPDATED

(71) Applicant: SONY GROUP CORPORATION, Tokyo (JP)

(72) Inventor: Ryuta Satoh, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 137 days.

(21) Appl. No.: 18/003,334

(22) PCT Filed: Jun. 21, 2021

(86) PCT No.: PCT/JP2021/023310
§ 371 (c)(1),
(2) Date: Dec. 26, 2022

(87) PCT Pub. No.: WO2022/004448
PCT Pub. Date: Jan. 6, 2022

(65) Prior Publication Data
US 2023/0251846 A1    Aug. 10, 2023

(30) Foreign Application Priority Data
Jul. 3, 2020   (JP) .................. 2020-115429

(51) Int. Cl.
*G06F 8/65*   (2018.01)
*G06T 7/70*   (2017.01)
(Continued)

(52) U.S. Cl.
CPC .................. *G06F 8/65* (2013.01); *G06T 7/70* (2017.01); *G06V 10/761* (2022.01); *G06V 20/56* (2022.01)

(58) Field of Classification Search
None
See application file for complete search history.

(56) References Cited

U.S. PATENT DOCUMENTS 6,556,904 B1 * 4/2003 Larson ................... G07C 5/008
701/34.3
2010/0228404 A1 * 9/2010 Link .................... G06F 9/44542
701/1

(Continued)

FOREIGN PATENT DOCUMENTS

JP   2017-154725 A   9/2017
WO   2017/057060 A1   4/2017

(Continued)

OTHER PUBLICATIONS

International Search Report and Written Opinion of PCT Application No. PCT/JP2021/023310, issued on Aug. 31, 2021, 08 pages of ISRWO.

*Primary Examiner* — Qing Chen
(74) *Attorney, Agent, or Firm* — CHIP LAW GROUP

(57) ABSTRACT

The present disclosure relates to an information processing apparatus, an information processing method, an information processing system, and a program that enable an SW to be easily updated with an adjustment content according to a request of a user. Vehicle accumulation information including an image for relearning the SW that functions as an object recognition section that recognizes an object around a vehicle and an object recognition result is acquired from the image around the vehicle, adjustment content requested by the user of the vehicle regarding the relearning of the SW is decided, and the SW is relearned on the basis of the vehicle accumulation information and the adjustment content. The present disclosure can be applied to an automated driving technology.

20 Claims, 17 Drawing Sheets

(51) Int. Cl.
*G06V 10/74* (2022.01)
*G06V 20/56* (2022.01)

(56) References Cited

U.S. PATENT DOCUMENTS

| | | |
|---|---|---|
| 2019/0392254 A1 | 12/2019 | Oh |
| 2020/0201621 A1* | 6/2020 | Buecherl .................. G06F 8/65 |
| 2021/0116930 A1 | 4/2021 | Ariki |
| 2021/0342631 A1* | 11/2021 | Takahashi ........... G06F 18/2411 |
| 2021/0390283 A1 | 12/2021 | Futatsugi |

FOREIGN PATENT DOCUMENTS

| | | |
|---|---|---|
| WO | 2018/142749 A1 | 8/2018 |
| WO | 2019/167457 A1 | 9/2019 |
| WO | 2020/095545 A1 | 5/2020 |

\* cited by examiner

INFORMATION PROCESSING APPARATUS, INFORMATION PROCESSING METHOD, AND INFORMATION PROCESSING SYSTEM TO ENABLE SOFTWARE PROGRAM TO BE EASILY UPDATED

CROSS REFERENCE TO RELATED APPLICATIONS

This application is a U.S. National Phase of International Patent Application No. PCT/JP2021/023310 filed on Jun. 21, 2021, which claims priority benefit of Japanese Patent Application No. JP 2020-115429 filed in the Japan Patent Office on Jul. 3, 2020. Each of the above-referenced applications is hereby incorporated herein by reference in its entirety.

TECHNICAL FIELD

The present disclosure relates to an information processing apparatus, an information processing method, an information processing system, and a program, and more particularly, to an information processing apparatus, an information processing method, an information processing system, and a program capable of easily updating a software program (SW) with an adjustment content according to a request of a user.

BACKGROUND ART

Various problems occur in a software program (SW) mounted on hardware as use progresses, but development is progressed so as to solve the generated problems, an update SW for updating to the developed SW is repeatedly distributed, and the SW is updated by the update SW, thereby improving convenience.

Therefore, a technology has been proposed in which a timing of updating the SW is set in advance by the update SW, and the SW is efficiently updated (see Patent Document 1).

CITATION LIST

Patent Document

Patent Document 1: WO 2018/142749 A

SUMMARY OF THE INVENTION

Problems to be Solved by the Invention

Meanwhile, in updating an SW mounted on a vehicle, there is a case where a parameter is set so as to have an adjustment content according to a request of a driver who is a user, and the SW is updated so as to have an adjustment content according to the request.

However, in the technology of Patent Document 1, even if the update timing can be set, it is not possible to update the SW by setting the parameter so as to have the adjustment content according to the request of the user.

Furthermore, in a case where the parameter is set so as to have the adjustment content according to the request of the user and the SW is updated, in a case where the adjustment content is the sensitivity, the intensity, or the like, it is possible to set the adjustment content only by adjusting the parameter corresponding to each.

However, for example, in a case of an SW or the like that executes object recognition processing, in a case where it is desired to set the SW such that a distant object can be recognized at an earlier timing although the accuracy may be low, it is difficult to recognize how much adjustment should be performed on what kind of parameter to achieve a desired adjustment content. As a result, the SW may not be updated so as to have the adjustment content according to the request of the user.

The present disclosure has been made in view of such a situation, and particularly, an object of the present disclosure is to enable a software program (SW) to be easily updated with an adjustment content according to a request of a user.

Solutions to Problems

An information processing apparatus, an information processing system, and a program according to one aspect of the present disclosure are an information processing apparatus, an information processing system, and a program including: an adjustment content decision section that decides an adjustment content requested by a user of a vehicle regarding update of a software program (SW) of the vehicle; and an update section that updates the SW on the basis of the adjustment content.

An information processing method according to one aspect of the present disclosure is an information processing method including the steps of: deciding an adjustment content requested by a user of a vehicle regarding update of a software program (SW) of the vehicle; and updating the SW on the basis of the adjustment content.

In one aspect of the present disclosure, an adjustment content requested by a user of a vehicle regarding update of a software program (SW) of the vehicle is decided, and the SW is updated on the basis of the adjustment content.

MODE FOR CARRYING OUT THE INVENTION

Figure 1:
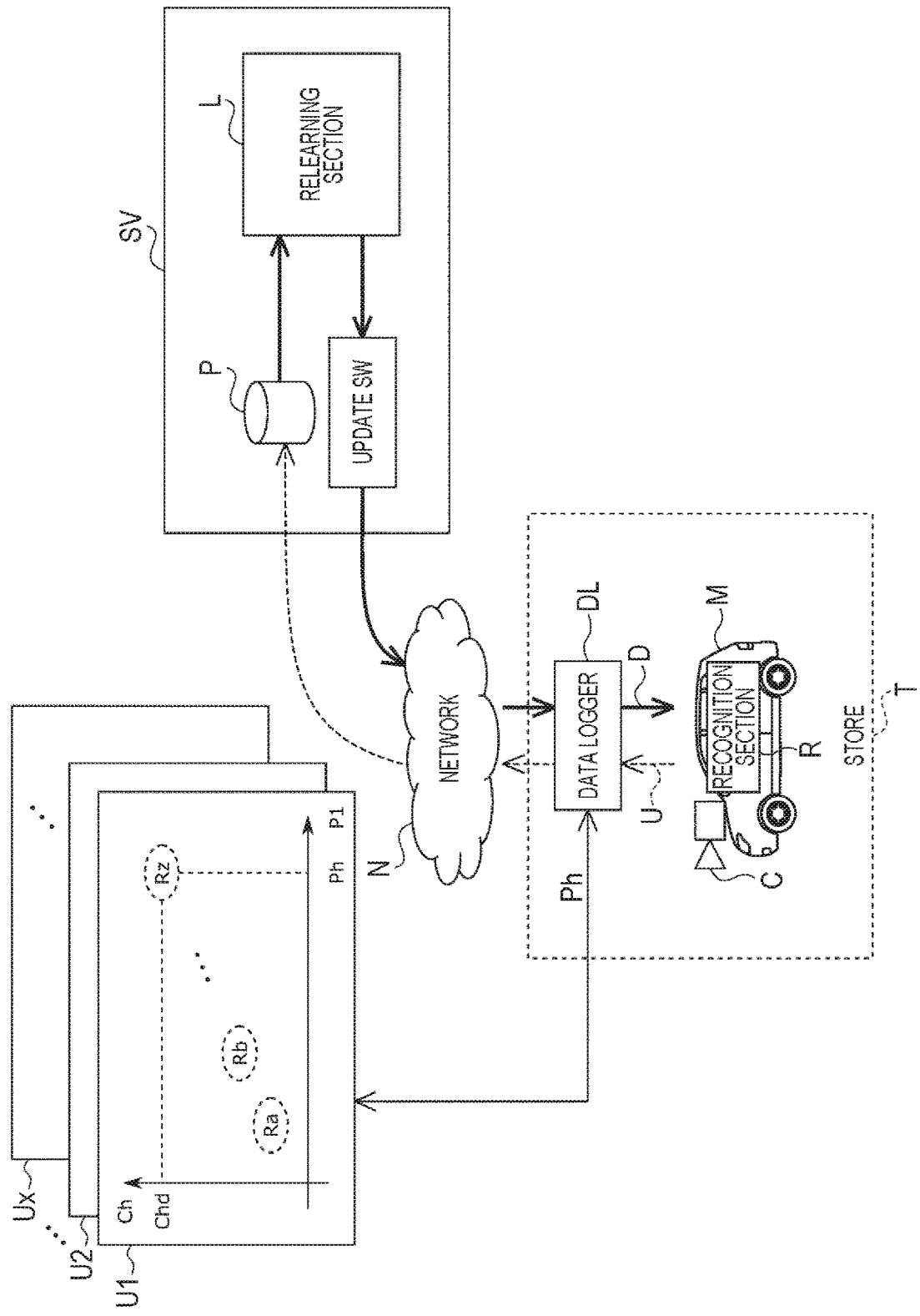
FIG. 1 is a diagram illustrating an overview of the present disclosure.

Hereinafter, preferred embodiments of the present disclosure will be described in detail with reference to the accompanying drawings. Note that, in the present specification and the drawings, components having substantially the same functional configuration are denoted by the same reference numerals, and redundant description is omitted.

Hereinafter, modes for carrying out the present technology will be described. The description will be given in the following order.

1. Overview of Present Disclosure
2. First Embodiment
3. Second Embodiment
4. Third Embodiment
5. Example Executed by Software

1. Overview of Present Disclosure

The present disclosure enables a software program (SW) to be easily updated with an adjustment content according to a request of a user.

Note that, in the present specification, a case where the SW is a recognition section that implements object recognition processing of recognizing an object present in the surroundings on the basis of an image obtained by imaging the surroundings in order to implement automated driving of a vehicle capable of automated driving will be described as an example.

However, the SW applied to the present disclosure is not limited to the recognition section that implements the object recognition processing, and is only required to be an updatable SW.

Furthermore, the recognition section that implements the object recognition processing as the SW applied to the present disclosure is configured by machine learning.

It is known that an SW including a recognition section generated by machine learning can improve recognition accuracy by repeating further machine learning (relearning) with learning data collected for learning.

Therefore, for the SW such as the recognition section, while executing the object recognition processing, information of an image and a recognition result associated with the execution is collected as learning data, and the recognition accuracy can be continuously improved by relearning using the collected learning data.

Here, an overview of the present disclosure will be described with reference to FIG. 1 by exemplifying an SW management system that manages an SW as a recognition section that implements object recognition processing.

The SW management system in FIG. 1 includes a vehicle M including an SW as a recognition section R that implements object recognition processing, and a server Sv for managing the SW.

Furthermore, the vehicle M is connected to the server Sv via a network N by being connected to a data logger DL provided in a store T such as a dealer or the like in charge of sales, maintenance, or the like of the vehicle M in a wired or wireless manner or the like.

The vehicle M includes a camera C and the recognition section R.

The camera C captures an image of the surroundings of the vehicle M required for implementing the automated driving of the vehicle M.

The recognition section R implements object recognition processing on the basis of an image captured by the camera C, and recognizes an object present around the vehicle M.

The vehicle M implements automated driving on the basis of the recognition result of the recognition section R.

Furthermore, the vehicle M supplies information obtained by combining the image captured by the camera C and the recognition result by the object recognition processing implemented by the recognition section R to the data logger DL as vehicle accumulation information U. The data logger DL receives a parameter Ph related to a request for an update content from a user in the vehicle accumulation information U, and transmits the parameter Ph to the server Sv via the network N.

The server SV accumulates the parameter Ph related to the request of the user as a parameter P in the vehicle accumulation information U obtained by combining the image captured by the camera C and the recognition result of the recognition section R transmitted from the data logger DL via the network N.

The server SV includes a relearning section L of the recognition section R.

The relearning section L relearns the recognition section R by using the information accumulated as the parameter P including the vehicle accumulation information U and the parameter Ph as the data for learning, generates the update SW for updating to the relearned recognition section R, and supplies the update SW to the data logger DL as information D via the network N.

The data logger DL supplies the update SW delivered as the information D from the server Sv to the vehicle M to update the recognition section R.

Since the recognition section R updated by the update SW is relearned on the basis of the information in which the parameter Ph related to the request of the user is added to the vehicle accumulation information U obtained by combining the image captured by the camera C and the recognition result of the recognition section R, not only the accuracy related to the object recognition processing is improved, but also the recognition section R is updated to one having characteristics according to the request of the user.

Here, in order to set the parameter Ph according to the request of the user, if the parameter is an intuitive parameter such as the strength or the like of the sensitivity or the intensity, it is possible to perform adjustment by instructing which parameter is adjusted to what extent.

However, in an case of an SW such as object recognition processing or the like, for example, in a case where it is desired to set the SW such that a distant object can be recognized at an earlier timing although the accuracy may be low, or in a case where it is desired to set the SW to be improved because a specific object in a specific place is erroneously recognized, it is not possible to know how much adjustment should be performed on what kind of parameter to enable the adjustment according to the request. As a result, the adjustment content of the SW may not be set and updated according to the request of the user.

Therefore, in the present disclosure, by presenting information that allows recognition of the relationship between the adjustable parameter and the characteristic change of the SW reflected by the adjustment of the parameter and receiving the input of the parameter according to the request of the user, the adjustment content related to the update of the SW can be set according to the request of the user.

More specifically, in the present disclosure, an adjustment image for each parameter is prepared in advance, and the relationship between the parameter and the characteristic change of the SW is displayed in the adjustment image corresponding to the selected parameter, so that the selected parameter can be set.

In a case where there are parameters P1 to Px as adjustable parameters, for example, as illustrated in the upper left part of FIG. 1, adjustment images U1 to Ux corresponding to the respective parameters are prepared. In the upper left part of FIG. 1, an adjustment image U1 for adjusting the parameter P1 is displayed.

In the adjustment image U1, the horizontal axis indicates the value of the parameter P1, and the vertical axis indicates the value of the characteristic Ch.

That is, the adjustment image U1 illustrates a state in which the characteristic Ch of the SW in the case of being adjusted according to the parameter P1 changes as the characteristics Ra to Rz.

Since the user can recognize the characteristic that changes by the adjustment of the parameter P1 while viewing the adjustment image U1, it is possible to set the value of the parameter P1 to have a desired adjustment content.

In FIG. 1, for example, in a case where the user desires a value Chd for the characteristic Ch, the value Ph is set as the value of the corresponding parameter P1.

An adjustment image illustrating a correspondence relationship between the type of adjustable parameter and the type of characteristic is prepared, and various parameters can be adjusted by switching and displaying the type of characteristic and the type of parameter desired to be adjusted.

As a result, it is possible to update the software program (SW) to have the adjustment content according to the request of the user.

2. First Embodiment

<Configuration Example of SW Management System of Present Disclosure>

Next, a configuration example of the SW management system of the present disclosure will be described with reference to FIG. 2.

The SW management system 10 of the present disclosure includes vehicles 1-1 to 1-n, data loggers 2-1 to 2-n, a server 3, and a network 4. Note that the vehicles 1-1 to 1-n and the data loggers 2-1 to 2-n will be simply referred to as the vehicle 1 and the data logger 2 in a case where it is not particularly necessary to distinguish them, and other configurations will be similarly referred to.

Each of the vehicles 1-1 to 1-n has a configuration corresponding to the vehicle M in FIG. 1, and is a vehicle capable of automated driving.

The vehicles 1-1 to 1-n include cameras 1a-1 to 1a-n that capture images of the respective surroundings, and recognition sections 1b-1 to 1b-n that recognize objects present in the surroundings on the basis of the images captured by the cameras 1a-1 to 1a-n, and automated driving is implemented on the basis of the recognition results of the recognition sections 1b-1 to 1b-n.

Furthermore, each of the recognition sections 1b-1 to 1b-n mounted on each of the vehicles 1-1 to 1-n is a software program (SW), and the update is repeated by the update SW distributed from the server 3.

The data loggers 2-1 to 2-n are installed in stores 5-1 to 5-n such as a dealer, a maintenance factory, or the like that sells the vehicle 1, and are connected to the vehicle 1 in a wired or wireless manner to exchange various data with the vehicle 1, transmit the data to the server 3 via the network 4, and encourage relearning of the recognition section 1b.

Furthermore, the data logger 2 receives the update SW for updating the SW configuring the recognition section 1b generated by relearning by the server 3 via the network 4, and updates the recognition section 1b of the connected vehicle 1 on the basis of the received update SW.

More specifically, the data logger 2 extracts information of an image captured by the camera 1a in the vehicle 1 and a recognition result of the recognition section 1b as vehicle accumulation information, and receives an input of a request parameter that is a parameter corresponding to a request of the user regarding update of the recognition section 1b.

Then, the data logger 2 supplies the vehicle accumulation information and the request parameter together as data for learning to the server 3 via the network 4, and encourages relearning of the SW configuring the recognition section 1b.

Furthermore, the data logger 2 acquires, via the network 4, the update SW for updating the SW configuring the recognition section 1b relearned by the server 3 on the basis of the vehicle accumulation information and the request parameter, and updates the recognition section 1b of the vehicle 1.

The server 3 causes the recognition section 1b to relearn by using, as data for learning, the vehicle accumulation information obtained by combining the images captured by the cameras 1a-1 to 1a-n and the recognition results of the recognition sections 1b-1 to 1b-n transmitted from the data loggers 2-1 to 2-n via the network 4 and the request parameter according to the request for the update content of the recognition section 1b.

Then, the server 3 generates an update SW for updating the recognition section 1b to the relearned state, and distributes the update SW to the data loggers 2-1 to 2-n via the network 4. Each of the data loggers 2-1 to 2-n updates the recognition sections 1b-1 to 1b-n of the vehicles 1-1 to 1-n by the distributed update SW.

When receiving the input of the request parameter according to the request for the adjustment content related to the update of the recognition section 1b, the data logger 2 presents information in which the relationship between the change in the parameter and the change in the characteristic of the recognition section 1b can be recognized for every type of adjustable parameter, and receives the input of the parameter based on the presented information.

As a result, the software program (SW) configuring the recognition section 1b can be updated with the adjustment content according to the request of the user.

<Configuration Example of Vehicle Control System>

Figure 3:
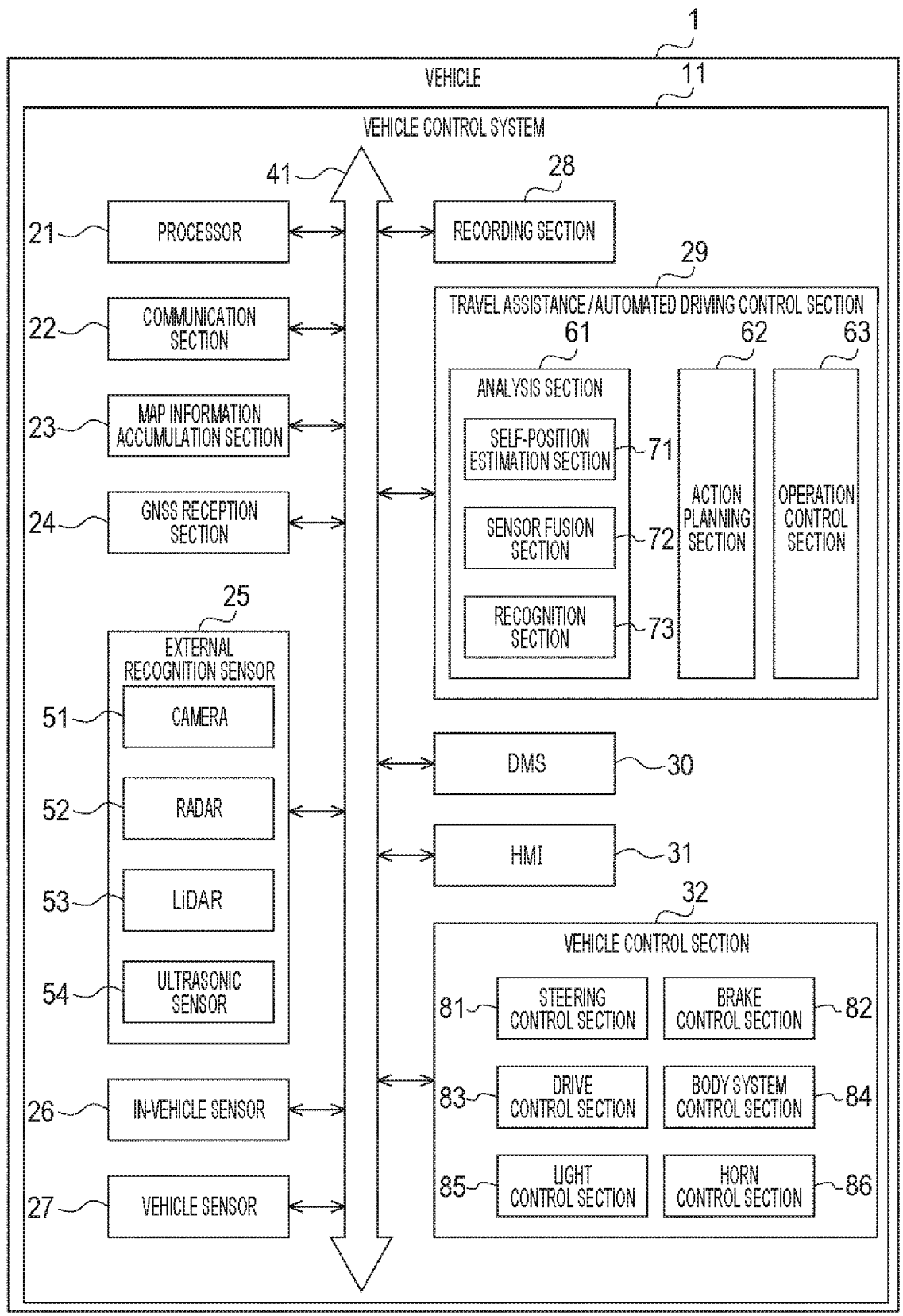
FIG. 3 is a block diagram illustrating a configuration example of a vehicle control system.
Figure 4:
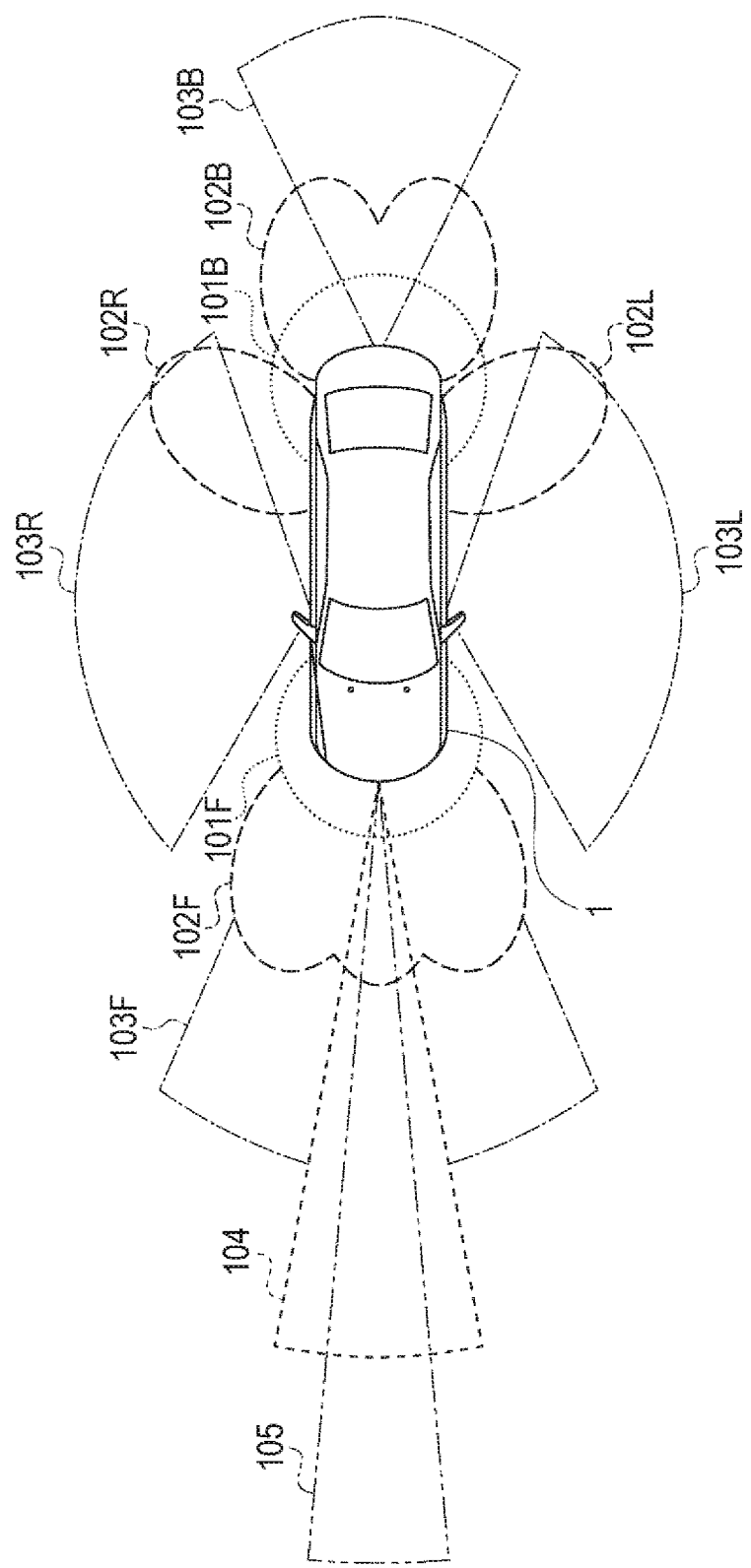
FIG. 4 is a diagram illustrating an example of sensing areas.

FIG. 3 is a block diagram illustrating a configuration example of a vehicle control system 11 which is an example of a moving device control system of the vehicle 1 to which the present technology is applied.

The vehicle control system 11 is provided in the vehicle 1 and performs processing related to travel assistance and automated driving of the vehicle 1.

The vehicle control system 11 includes a processor 21, a communication section 22, a map information accumulation section 23, a global navigation satellite system (GNSS)

reception section 24, an external recognition sensor 25, an in-vehicle sensor 26, a vehicle sensor 27, a recording section 28, a travel assistance/automated driving control section 29, a driver monitoring system (DMS) 30, a human machine interface (HMI) 31, and a vehicle control section 32.

The processor 21, the communication section 22, the map information accumulation section 23, the GNSS reception section 24, the external recognition sensor 25, the in-vehicle sensor 26, the vehicle sensor 27, the recording section 28, the travel assistance/automated driving control section 29, the driver monitoring system (DMS) 30, the human machine interface (HMI) 31, and the vehicle control section 32 are connected to one another via a communication network 41. The communication network 41 includes, for example, an in-vehicle communication network, a bus, or the like conforming to an arbitrary standard such as a controller area network (CAN), a local interconnect network (LIN), a local area network (LAN), FlexRay (registered trademark), Ethernet (registered trademark), or the like. Note that each section of the vehicle control system 11 may be directly connected by, for example, near field communication (NFC), Bluetooth (registered trademark), or the like without passing through the communication network 41.

Note that, hereinafter, in a case where each section of the vehicle control system 11 performs communication via the communication network 41, description of the communication network 41 will be omitted. For example, in a case where the processor 21 and the communication section 22 perform communication via the communication network 41, it is simply described that the processor 21 and the communication section 22 perform communication.

The processor 21 includes various processors such as a central processing unit (CPU), a micro processing unit (MPU), an electronic control unit (ECU), and the like, for example. The processor 21 controls the entire vehicle control system 11.

The communication section 22 communicates with various devices inside and outside the vehicle, other vehicles, servers, base stations, and the like, and transmits and receives various data. As the communication with the outside of the vehicle, for example, the communication section 22 receives a program for updating software for controlling the operation of the vehicle control system 11, map information, traffic information, information around the vehicle 1, and the like from the outside. For example, the communication section 22 transmits information regarding the vehicle 1 (for example, data indicating the state of the vehicle 1, a recognition result by the recognition section 73, and the like), information around the vehicle 1, and the like to the outside. For example, the communication section 22 performs communication corresponding to a vehicle emergency call system such as an eCall, or the like.

Note that a communication method of the communication section 22 is not particularly limited. Furthermore, a plurality of communication methods may be used.

As communication with the inside of the vehicle, for example, the communication section 22 performs wireless communication with a device in the vehicle by a communication method such as wireless LAN, Bluetooth, NFC, wireless USB (WUSB), or the like. For example, the communication section 22 performs wired communication with a device in the vehicle by a communication method such as a universal serial bus (USB), a high-definition multimedia interface (HDMI, registered trademark), a mobile high-definition link (MHL), or the like via a connection terminal (and, if necessary, a cable) not illustrated.

Here, the in-vehicle device is, for example, a device that is not connected to the communication network 41 in the vehicle. For example, a mobile device or a wearable device carried by an occupant such as a driver, an information device brought into the vehicle and temporarily installed, or the like is assumed.

For example, the communication section 22 communicates with a server or the like present on an external network (for example, the Internet, a cloud network, or a company-specific network) via a base station or an access point by a wireless communication method such as fourth generation mobile communication system (4G), fifth generation mobile communication system (5G), long term evolution (LTE), dedicated short range communications (DSRC), or the like.

For example, the communication section 22 communicates with a terminal (for example, a terminal of a pedestrian or a store, or a machine type communication (MTC) terminal) present in the vicinity of the host vehicle using a peer to peer (P2P) technology. For example, the communication section 22 performs V2X communication. The V2X communication is, for example, vehicle to vehicle communication with another vehicle, vehicle to infrastructure communication with a roadside device or the like, vehicle to home communication, vehicle to pedestrian communication with a terminal or the like possessed by a pedestrian, or the like.

For example, the communication section 22 receives an electromagnetic wave transmitted by a road traffic information communication system (vehicle information and communication system (VICS), registered trademark) such as a radio wave beacon, an optical beacon, FM multiplex broadcasting, or the like.

The map information accumulation section 23 accumulates a map acquired from the outside and a map created by the vehicle 1. For example, the map information accumulation section 23 accumulates a three-dimensional high-precision map, a global map having lower accuracy than the high-precision map but covering a wide area, and the like.

The high-precision map is, for example, a dynamic map, a point cloud map, a vector map (also referred to as an advanced driver assistance system (ADAS) map), or the like. The dynamic map is, for example, a map including four layers of dynamic information, semi-dynamic information, semi-static information, and static information, and is provided from an external server or the like. The point cloud map is a map including point clouds (point cloud data). The vector map is a map in which information such as a lane, a position of a signal, or the like is associated with the point cloud map. The point cloud map and the vector map may be provided from, for example, an external server or the like, or may be created by the vehicle 1 as a map for performing matching with a local map to be described later on the basis of a sensing result by a radar 52, a LiDAR 53, or the like, and may be accumulated in the map information accumulation section 23. Furthermore, in a case where a high-precision map is provided from an external server or the like, for example, map data of several hundred meters square regarding a planned route on which the vehicle 1 travels from now is acquired from the server or the like in order to reduce the communication capacity.

The GNSS reception section 24 receives a GNSS signal from a GNSS satellite, and supplies the GNSS signal to the travel assistance/automated driving control section 29.

The external recognition sensor 25 includes various sensors used for recognizing a situation outside the vehicle 1, and supplies sensor data from each sensor to each section of the vehicle control system 11. The type and number of sensors included in the external recognition sensor 25 are arbitrary.

For example, the external recognition sensor 25 includes a camera 51, a radar 52, a light detection and ranging or laser imaging detection and ranging (LiDAR) 53, and an ultrasonic sensor 54. The number of cameras 51, radars 52, LiDAR 53, and ultrasonic sensors 54 is arbitrary, and an example of a sensing area of each sensor will be described later.

Note that, as the camera 51, for example, a camera of an arbitrary imaging method such as a time of flight (ToF) camera, a stereo camera, a monocular camera, an infrared camera, or the like is used as necessary.

Furthermore, for example, the external recognition sensor 25 includes an environment sensor for detecting weather, climate, brightness, and the like. The environment sensor includes, for example, a raindrop sensor, a fog sensor, a sunshine sensor, a snow sensor, an illuminance sensor, and the like.

Moreover, for example, the external recognition sensor 25 includes a microphone used for detecting a sound around the vehicle 1, a position of a sound source, and the like.

The in-vehicle sensor 26 includes various sensors for detecting information inside the vehicle, and supplies sensor data from each sensor to each section of the vehicle control system 11. The type and number of sensors included in the in-vehicle sensor 26 are arbitrary.

For example, the in-vehicle sensor 26 includes a camera, a radar, a seating sensor, a steering wheel sensor, a microphone, a biometric sensor, and the like. As the camera, for example, a camera of any imaging method such as a ToF camera, a stereo camera, a monocular camera, an infrared camera, or the like can be used. The biometric sensor is provided, for example, on a seat, a steering wheel, or the like, and detects various types of biometric information of an occupant such as a driver.

The vehicle sensor 27 includes various sensors for detecting the state of the vehicle 1, and supplies sensor data from each sensor to each section of the vehicle control system 11. The type and number of sensors included in the vehicle sensor 27 are arbitrary.

For example, the vehicle sensor 27 includes a speed sensor, an acceleration sensor, an angular velocity sensor (gyro sensor), and an inertial measurement unit (IMU). For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of rotations of the engine or the motor, an air pressure sensor that detects the air pressure of the tire, a slip rate sensor that detects the slip rate of the tire, and a wheel speed sensor that detects the rotation speed of the wheel. For example, the vehicle sensor 27 includes a battery sensor that detects the remaining amount and temperature of the battery, and an impact sensor that detects an external impact.

The recording section 28 includes, for example, a read only memory (ROM), a random access memory (RAM), a magnetic storage device such as a hard disc drive (HDD), a semiconductor storage device, an optical storage device, a magneto-optical storage device, and the like. The recording section 28 records various programs, data, and the like used by each section of the vehicle control system 11. For example, the recording section 28 records a rosbag file including a message transmitted and received by a robot operating system (ROS) in which an application program related to automated driving operates. For example, the recording section 28 includes an event data recorder (EDR) and a data storage system for automated driving (DSSAD), and records information of the vehicle 1 before and after an event such as an accident or the like.

The travel assistance/automated driving control section 29 controls travel assistance and automated driving of the vehicle 1. For example, the travel assistance/automated driving control section 29 includes an analysis section 61, an action planning section 62, and an operation control section 63.

The analysis section 61 performs analysis processing of the situation of the vehicle 1 and the surroundings. The analysis section 61 includes a self-position estimation section 71, a sensor fusion section 72, and a recognition section 73.

The self-position estimation section 71 estimates the self-position of the vehicle 1 on the basis of the sensor data from the external recognition sensor 25 and the high-precision map accumulated in the map information accumulation section 23. For example, the self-position estimation section 71 generates a local map on the basis of sensor data from the external recognition sensor 25, and estimates the self-position of the vehicle 1 by matching the local map with the high-precision map. The position of the vehicle 1 is based on, for example, the center of the rear wheel pair axle.

The local map is, for example, a three-dimensional high-precision map created using a technology such as simultaneous localization and mapping (SLAM), an occupancy grid map, or the like. The three-dimensional high-precision map is, for example, the above-described point cloud map or the like. The occupancy grid map is a map in which a three-dimensional or two-dimensional space around the vehicle 1 is divided into grids of a predetermined size, and an occupancy state of objects is indicated in units of grids. The occupancy state of objects is indicated by, for example, the presence or absence or existence probability of objects. The local map is also used for detection processing and recognition processing of a situation outside the vehicle 1 by the recognition section 73, for example.

Note that the self-position estimation section 71 may estimate the self-position of the vehicle 1 on the basis of the GNSS signal and the sensor data from the vehicle sensor 27.

The sensor fusion section 72 performs sensor fusion processing of combining a plurality of different types of sensor data (for example, image data supplied from the camera 51 and sensor data supplied from the radar 52) to obtain new information. Methods for combining different types of sensor data include integration, fusion, association, and the like.

The recognition section 73 performs detection processing and recognition processing of a situation outside the vehicle 1.

For example, the recognition section 73 performs detection processing and recognition processing of a situation outside the vehicle 1 on the basis of information from the external recognition sensor 25, information from the self-position estimation section 71, information from the sensor fusion section 72, and the like.

Specifically, for example, the recognition section 73 performs detection processing, recognition processing, and the like of an object around the vehicle 1. The object detection processing is, for example, processing of detecting the presence or absence, size, shape, position, movement, and the like of an object. The object recognition processing is, for example, processing of recognizing an attribute such as a type of an object or the like or identifying a specific object. However, the detection processing and the recognition processing are not necessarily clearly divided, and may overlap.

For example, the recognition section 73 detects an object around the vehicle 1 by performing clustering for classifying point clouds based on sensor data such as LiDAR, radar, or the like for each cluster of point clouds. As a result, the presence or absence, size, shape, and position of an object around the vehicle 1 are detected.

For example, the recognition section 73 detects the motion of the object around the vehicle 1 by performing tracking that follows the motion of the cluster of the point clouds classified by clustering. As a result, the speed and the traveling direction (movement vector) of the object around the vehicle 1 are detected.

For example, the recognition section 73 recognizes the type of the object around the vehicle 1 by performing object recognition processing such as semantic segmentation or the like on the image data supplied from the camera 51.

Note that, as the object to be detected or recognized, for example, a vehicle, a person, a bicycle, an obstacle, a structure, a road, a traffic light, a traffic sign, a road sign, and the like are assumed.

For example, the recognition section 73 performs recognition processing of traffic rules around the vehicle 1 on the basis of the map accumulated in the map information accumulation section 23, the estimation result of the self-position, and the recognition result of the object around the vehicle 1. By this processing, for example, the position and the state of the signal, the contents of the traffic sign and the road sign, the contents of the traffic regulation, the travelable lane, and the like are recognized.

For example, the recognition section 73 performs recognition processing of the environment around the vehicle 1. As the surrounding environment to be recognized, for example, weather, temperature, humidity, brightness, a state of a road surface, and the like are assumed.

The action planning section 62 creates an action plan of the vehicle 1. For example, the action planning section 62 creates an action plan by performing processing of route planning and route following.

Note that the route planning (global path planning) is a process of planning a rough route from the start to the goal. This route planning is called track planning, and includes processing of track generation (local path planning) that enables safe and smooth traveling in the vicinity of the vehicle 1 in consideration of the motion characteristics of the vehicle 1 in the route planned by the route planning.

The route following is a process of planning an operation for safely and accurately traveling a route planned by the route planning within a planned time. For example, the target speed and the target angular velocity of the vehicle 1 are calculated.

The operation control section 63 controls the operation of the vehicle 1 in order to implement the action plan created by the action planning section 62.

For example, the operation control section 63 controls a steering control section 81, a brake control section 82, and a drive control section 83 to perform acceleration/deceleration control and direction control such that the vehicle 1 travels on the track calculated by the track planning. For example, the operation control section 63 performs cooperative control for the purpose of implementing the functions of the ADAS such as collision avoidance or impact mitigation, follow-up traveling, vehicle speed maintaining traveling, collision warning of the host vehicle, lane deviation warning of the host vehicle, and the like. For example, the operation control section 63 performs cooperative control for the purpose of automated driving or the like in which the vehicle automatedly travels without depending on the operation of the driver.

The DMS 30 performs authentication processing of the driver, recognition processing of the state of the driver, and the like on the basis of sensor data from the in-vehicle sensor 26, input data input to the HMI 31, and the like. As the state of the driver to be recognized, for example, a physical condition, a wakefulness level, a concentration level, a fatigue level, a line-of-sight direction, a drunkenness level, a driving operation, a posture, and the like are assumed.

Note that the DMS 30 may perform authentication processing of an occupant other than the driver and recognition processing of the state of the occupant. Furthermore, for example, the DMS 30 may perform recognition processing of the situation inside the vehicle on the basis of sensor data from the in-vehicle sensor 26. As the situation inside the vehicle to be recognized, for example, temperature, humidity, brightness, odor, and the like are assumed.

The HMI 31 is used for inputting various data, instructions, and the like, generates an input signal on the basis of the input data, instructions, and the like, and supplies the input signal to each section of the vehicle control system 11. For example, the HMI 31 includes an operation device such as a touch panel, a button, a microphone, a switch, a lever, and the like, an operation device that can input by a method other than manual operation by voice, gesture, or the like, and the like. Note that the HMI 31 may be, for example, a remote control device using infrared rays or other radio waves, or an external connection device such as a mobile device, a wearable device, or the like compatible with the operation of the vehicle control system 11.

Furthermore, the HMI 31 performs output control to control generation and output of visual information, auditory information, and tactile information of the occupant or the outside of the vehicle, output content, output timing, an output method, and the like. The visual information is, for example, information indicated by an image or light of an operation screen, a state display of the vehicle 1, a warning display, a monitor image indicating a situation around the vehicle 1, or the like. The auditory information is, for example, information indicated by sound such as guidance, a warning sound, a warning message, or the like. The tactile information is, for example, information given to the tactile sense of the occupant by force, vibration, motion, or the like.

As a device that outputs visual information, for example, a display device, a projector, a navigation device, an instrument panel, a camera monitoring system (CMS), an electronic mirror, a lamp, and the like are assumed. The display device may be a device that displays visual information in the field of view of the occupant, such as a head-up display, a transmissive display, a wearable device having an augmented reality (AR) function, or the like, for example, in addition to a device having a normal display.

As a device that outputs auditory information, for example, an audio speaker, a headphone, an earphone, or the like is assumed.

As a device that outputs tactile information, for example, a haptic element using haptics technology or the like is assumed. The haptics element is provided, for example, on a steering wheel, a seat, or the like.

The vehicle control section 32 controls each section of the vehicle 1. The vehicle control section 32 includes a steering control section 81, a brake control section 82, a drive control section 83, a body system control section 84, a light control section 85, and a horn control section 86.

The steering control section 81 detects and controls the state of the steering system of the vehicle 1 or the like. The steering system includes, for example, a steering mechanism including a steering wheel and the like, an electric power steering, and the like. The steering control section 81 includes, for example, a control unit such as an ECU or the like that controls the steering system, an actuator that drives the steering system, and the like.

The brake control section 82 detects and controls the state of the brake system of the vehicle 1 or the like. The brake system includes, for example, a brake mechanism including a brake pedal, an antilock brake system (ABS), and the like. The brake control section 82 includes, for example, a control unit such as an ECU or the like that controls a brake system, an actuator that drives the brake system, and the like.

The drive control section 83 detects and controls the state of the drive system of the vehicle 1 or the like. The drive system includes, for example, a driving force generation device for generating a driving force such as an accelerator pedal, an internal combustion engine, a driving motor, or the like, a driving force transmission mechanism for transmitting the driving force to wheels, and the like. The drive control section 83 includes, for example, a control unit such as an ECU or the like that controls the drive system, an actuator that drives the drive system, and the like.

The body system control section 84 detects and controls the state of the body system of the vehicle 1 or the like. The body system includes, for example, a keyless entry system, a smart key system, a power window device, a power seat, an air conditioner, an airbag, a seat belt, a shift lever, and the like. The body system control section 84 includes, for example, a control unit such as an ECU or the like that controls the body system, an actuator that drives the body system, and the like.

The light control section 85 detects and controls states of various lights of the vehicle 1 or the like. As the light to be controlled, for example, a headlight, a backlight, a fog light, a turn signal, a brake light, a projection, a display of a bumper, and the like are assumed. The light control section 85 includes a control unit such as an ECU or the like that controls light, an actuator that drives light, and the like.

The horn control section 86 detects and controls the state of the car horn of the vehicle 1 or the like. The horn control section 86 includes, for example, a control unit such as an ECU or the like that controls the car horn, an actuator that drives the car horn, and the like.

Figure 2:
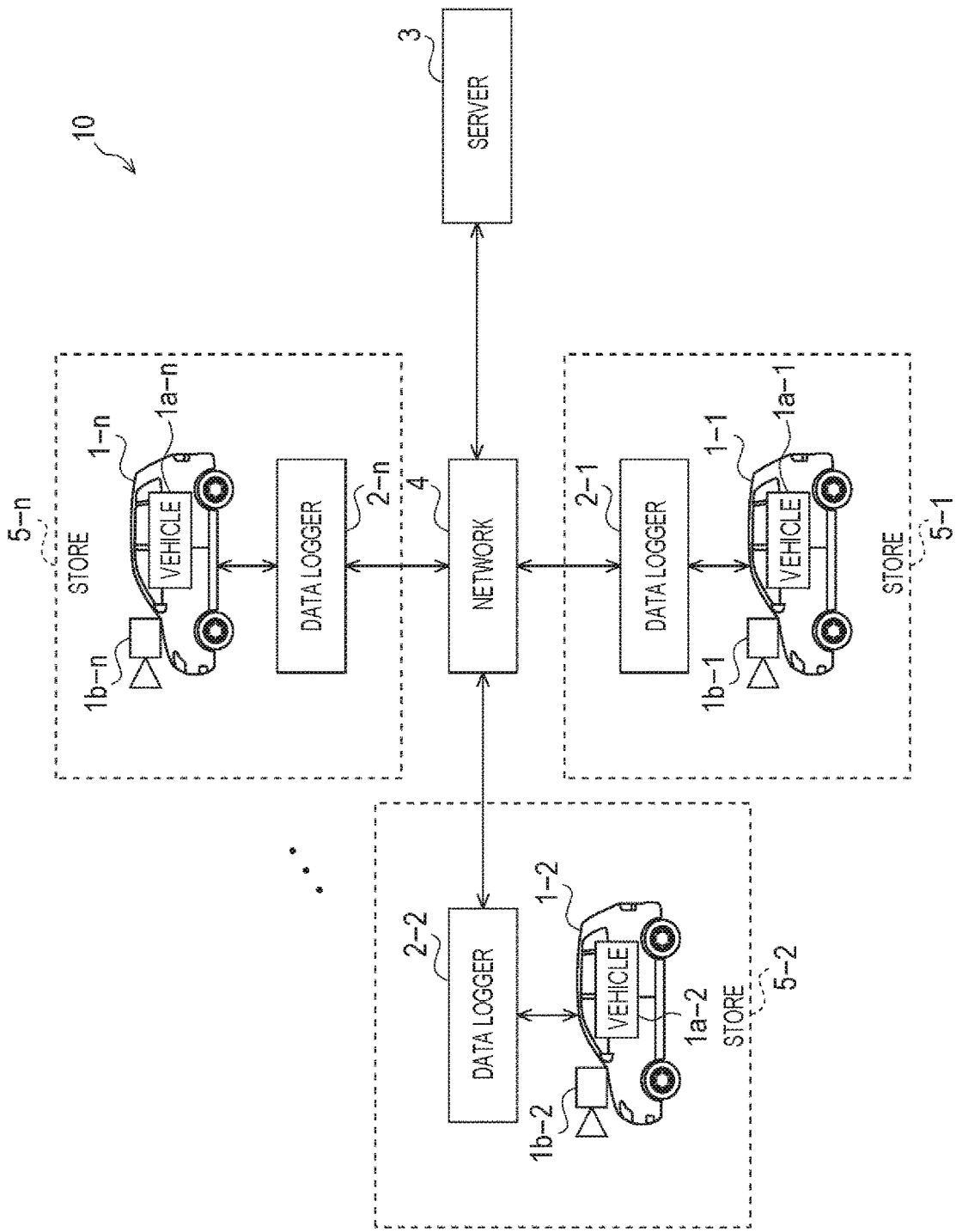
FIG. 2 is a block diagram illustrating a configuration example of an SW management system of the present disclosure.

FIG. 2 is a diagram illustrating an example of sensing areas by the camera 51, the radar 52, the LiDAR 53, and the ultrasonic sensor 54 of the external recognition sensor 25 in FIG. 1.

The sensing area 101F and the sensing area 101B illustrate examples of the sensing areas of the ultrasonic sensor 54. The sensing area 101F covers the periphery of the front end of the vehicle 1. The sensing area 101B covers the periphery of the rear end of the vehicle 1.

The sensing results in the sensing area 101F and the sensing area 101B are used, for example, for parking assistance or the like of the vehicle 1.

The sensing areas 102F to 102B illustrate examples of sensing areas of the radar 52 for a short distance or a middle distance. The sensing area 102F covers a position farther than the sensing area 101F in front of the vehicle 1. The sensing area 102B covers a position farther than the sensing area 101B behind the vehicle 1. The sensing area 102L covers the rear periphery of the left side surface of the vehicle 1. The sensing area 102R covers the rear periphery of the right side surface of the vehicle 1.

The sensing result in the sensing area 102F is used, for example, to detect a vehicle, a pedestrian, or the like present in front of the vehicle 1 or the like. The sensing result in the sensing area 102B is used, for example, for a collision prevention function or the like behind the vehicle 1. The sensing results in the sensing area 102L and the sensing area 102R are used, for example, for detecting an object in a blind spot on the sides of the vehicle 1 or the like.

The sensing areas 103F to 103B illustrate examples of sensing areas by the camera 51. The sensing area 103F covers a position farther than the sensing area 102F in front of the vehicle 1. The sensing area 103B covers a position farther than the sensing area 102B behind the vehicle 1. The sensing area 103L covers the periphery of the left side surface of the vehicle 1. The sensing area 103R covers the periphery of the right side surface of the vehicle 1.

The sensing result in the sensing area 103F is used for, for example, recognition of a traffic light or a traffic sign, a lane departure prevention assist system, and the like. The sensing result in the sensing area 103B is used for, for example, parking assistance, a surround view system, and the like. The sensing results in the sensing area 103L and the sensing area 103R are used for, for example, a surround view system or the like.

The sensing area 104 illustrates an example of a sensing area of the LiDAR 53. The sensing area 104 covers a position farther than the sensing area 103F in front of the vehicle 1. Meanwhile, the sensing area 104 has a narrower range in the left-right direction than the sensing area 103F.

The sensing result in the sensing area 104 is used for, for example, emergency braking, collision avoidance, pedestrian detection, and the like.

The sensing area 105 illustrates an example of the sensing area of the long-range radar 52. The sensing area 105 covers a position farther than the sensing area 104 in front of the vehicle 1. Meanwhile, the sensing area 105 has a narrower range in the left-right direction than the sensing area 104.

The sensing result in the sensing area 105 is used for, for example, adaptive cruise control (ACC) or the like.

Note that the sensing area of each sensor may have various configurations other than those in FIG. 2. Specifically, the ultrasonic sensor 54 may also sense the sides of the vehicle 1, or the LiDAR 53 may sense the rear of the vehicle 1.

Note that the camera 51 and the recognition section 73 in FIG. 3 have configurations corresponding to the camera 1a and the recognition section 1b in FIG. 2.

<Configuration Example of Data Logger>

Next, a configuration example of the data logger 2 will be described with reference to FIG. 5.

The data logger 2 includes a processor 111, an input section 112, an output section 113, a storage section 114, a communication section 115, a drive 116, and a removable storage medium 117, and is connected to each other via a bus 118, and can transmit and receive data and programs.

The processor 111 controls the overall operation of the data logger 2. Furthermore, the processor 111 includes an adjustment content decision section 131, an adjustment determination presentation section 132, and an update section 133.

The adjustment content decision section 131 acquires the vehicle accumulation information including the image captured by the camera 51 of the connected vehicle 1 and the recognition result of the recognition section 73, and receives, as a request parameter, a parameter for reflecting the request of the user with respect to the adjustment content related to the update of the recognition section 73, thereby deciding the adjustment content related to the update of the recognition section 73.

When receiving the input of the request parameter, the adjustment content decision section 131 stores an adjustment image representing a characteristic change of the recognition section 73 according to the adjustment of the parameter for each adjustable parameter, and switches the parameter according to the type of the characteristic desired by the user and displays the parameter on the output section 113, for example.

A user (a driver or an owner of the vehicle 1, or a worker or a maintenance worker of the store 5) can set various parameters by operating the input section 112 so as to match requested characteristics while viewing the adjustment image displayed on the output section 113. In the adjustment content decision section 131, the input section 112 is operated in this manner, and the set various parameters are received as the request parameters.

The adjustment content decision section 131 controls the communication section 115 to transmit the request parameter and the vehicle accumulation information received in this manner together to the server 3 via the network 4 to encourage relearning of the SW configuring the recognition section 73.

The adjustment determination presentation section 132 controls the communication section 115 to receive the update SW generated on the basis of the relearning supplied from the server 3 via the network 4 and the result of the simulation when the recognition section 73 is updated by the update SW as the adjustment determination result.

The adjustment determination result that is the result of the simulation when the recognition section 73 is updated by the update SW includes, in addition to the determination result as to whether or not the recognition section 73 updated by reflecting and relearning the request parameter appropriately functions, information indicating whether or not the characteristic of the recognition section 73 updated by being relearned implements a function having a characteristic in which the request parameter is appropriately reflected.

Therefore, the user (a driver or an owner of the vehicle 1, or a worker of the store 5) can check not only whether or not the function is appropriately performed but also whether or not the requested characteristic is obtained by viewing the presented adjustment determination result. Furthermore, when a state in which the recognition section 73 cannot appropriately function is found by simulation as a result of relearning according to the request parameter, the adjustment determination result includes information indicating the fact.

When instructed to update the recognition section 73 with the current update SW on the basis of the adjustment determination result presented by the adjustment determination presentation section 132, the update section 133 updates the recognition section 73 of the vehicle 1 on the basis of the update SW obtained by the adjustment determination presentation section 132. Furthermore, the update section 133 stops the update of the recognition section 73 in a case where it is indicated that the recognition section 73 is in a state of being unable to function appropriately by simulation as a result of relearning according to the request parameter on the basis of the adjustment determination result.

The input section 112 includes an input device such as a keyboard, a mouse, and the like with which the user inputs an operation command, and supplies various input signals to the processor 111.

The output section 113 is controlled by the processor 111, and outputs an image of a supplied operation screen and a processing result to a display device including a liquid crystal display (LCD), an organic electro luminescence (EL), or the like to display.

The storage section 114 includes a hard disk drive (HDD), a solid state drive (SSD), a semiconductor memory, or the like, is controlled by the processor 111, and writes or reads various data and programs including content data.

The communication section 115 is controlled by the processor 111, and transmits and receives various data and programs to and from various devices via a communication network represented by a local area network (LAN) or the like in a wired (or wireless (not illustrated)) manner.

The drive 116 reads and writes data from and to the removable storage medium 117 such as a magnetic disk (including a flexible disk), an optical disk (including a compact disc-read only memory (CD-ROM) and a digital versatile disc (DVD)), a magneto-optical disk (including a mini disc (MD)), a semiconductor memory, or the like.

<Configuration Example of Server>

Next, a configuration example of the server 3 will be described with reference to FIG. 6.

The server 3 includes a processor 151, an input section 152, an output section 153, a storage section 154, a communication section 155, a drive 156, and a removable storage medium 157, and is connected to each other via a bus 98, and can transmit and receive data and programs.

The processor 151 controls the entire operation of the server 3. Furthermore, the processor 151 includes a relearning section 171 and an adjustment determination section 172.

The relearning section 171 relearns the SW configuring the recognition section 73 and generates the update SW for updating the recognition section 73 on the basis of the relearning data including the vehicle accumulation information and the request parameter transmitted from the data logger 2.

The adjustment determination section 172 confirms the operation when the recognition section 73 is updated by relearning by simulation, determines whether or not the recognition section 73 functions appropriately, and generates an adjustment determination result. At this time, the adjustment determination result includes information regarding various characteristics of the recognition section 73.

The adjustment determination section 172 transmits the adjustment determination result together with the update SW to the data logger 2 via the network 4.

The input section 152 includes an input device such as a keyboard, a mouse, and the like with which the user inputs an operation command, and supplies various input signals to the processor 151.

The output section 153 is controlled by the processor 151, and outputs an image of a supplied operation screen and a processing result to a display device including a liquid crystal display (LCD), an organic electro luminescence (EL), or the like to display.

The storage section 154 includes a hard disk drive (HDD), a solid state drive (SSD), a semiconductor memory, or the like, is controlled by the processor 151, and writes or reads various data and programs including content data.

The communication section 155 is controlled by the processor 151, and transmits and receives various data and programs to and from various devices via a communication network represented by a local area network (LAN) or the like in a wired (or wireless (not illustrated)) manner.

The drive 156 reads and writes data from and to the removable storage medium 157 such as a magnetic disk (including a flexible disk), an optical disk (including a compact disc-read only memory (CD-ROM) and a digital versatile disc (DVD)), a magneto-optical disk (including a mini disc (MD)), a semiconductor memory, or the like.

<Function Implemented by SW Management System>

Next, functions implemented by the SW management system including the vehicle 1 of FIG. 3, the data logger 2 of FIG. 5, and the server 3 of FIG. 6 will be described with reference to a functional block diagram of FIG. 7.

The camera 51 of the vehicle 1 captures an image around the vehicle 1 and outputs the image to the recognition section 73 and the accumulation processing section 201.

Figure 7:
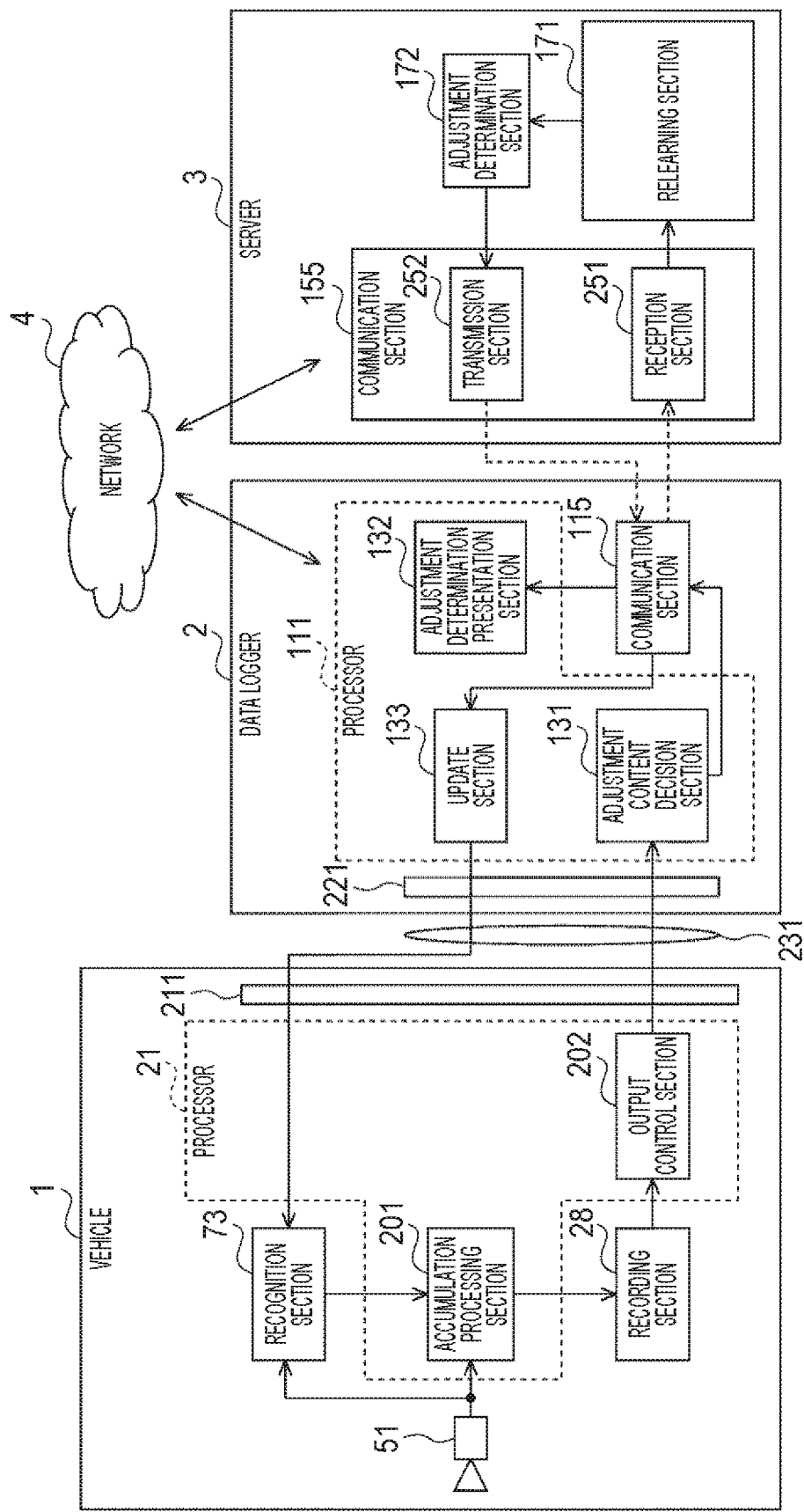
FIG. 7 is a functional block diagram illustrating a first embodiment of functions implemented by the SW management system in FIG. 2.

The recognition section 73 includes an SW generated by machine learning and managed by the SW management system in FIG. 7, executes object recognition processing on the basis of an image around the vehicle 1 captured by the camera 51, recognizes an object in the image, and outputs a recognition result to the accumulation processing section 201. Furthermore, when the vehicle 1 is brought to the store 5 of the dealer or the like and connected to the data logger 2 as the SW managed by the SW management system, the recognition section 73 is updated as necessary.

The accumulation processing section 201 sequentially accumulates the image around the vehicle 1 captured by the camera 51 and the recognition result of the corresponding image in the recording section 28 as vehicle accumulation information.

When the vehicle 1 and the data logger 2 are connected via mutual interfaces 211 and 221, the output control section 202 supplies the adjustment content decision section 131 of the data logger 2 from the communication line 231 connecting the vehicle 1 and the data logger 2.

Note that the communication line 231 is configured in a wired or wireless manner. However, when the entire function of the recognition section 73 that is the SW is completely updated, transmission and reception of large-capacity data is required. Therefore, in consideration of a processing time and a processing speed, it is desirable to use a wired connection. Furthermore, the communication line 231 may be configured wirelessly in a case where the transmission/reception capacity of data related to update is limited and small, such as updating a part of the functions of the recognition section 73.

The adjustment content decision section 131 receives an input of a request parameter for reflecting the adjustment content requested by the user at the time of relearning of the recognition section 73, decides the adjustment content by the received request parameter, controls the communication section 115 together with the vehicle accumulation information, and transmits the adjustment content to the server 3.

At this time, for example, the adjustment content decision section 131 controls the output section 113 to present the relationship between the request parameter and the characteristic of the recognition section 73 reflected when the request parameter is changed and relearned as an adjustment image that is easily visually recognized so that the adjustment content requested by the user can be recognized, and receives the input of the request parameter according to the input from the user via the adjustment image.

<Adjustment Image>

Figure 8:
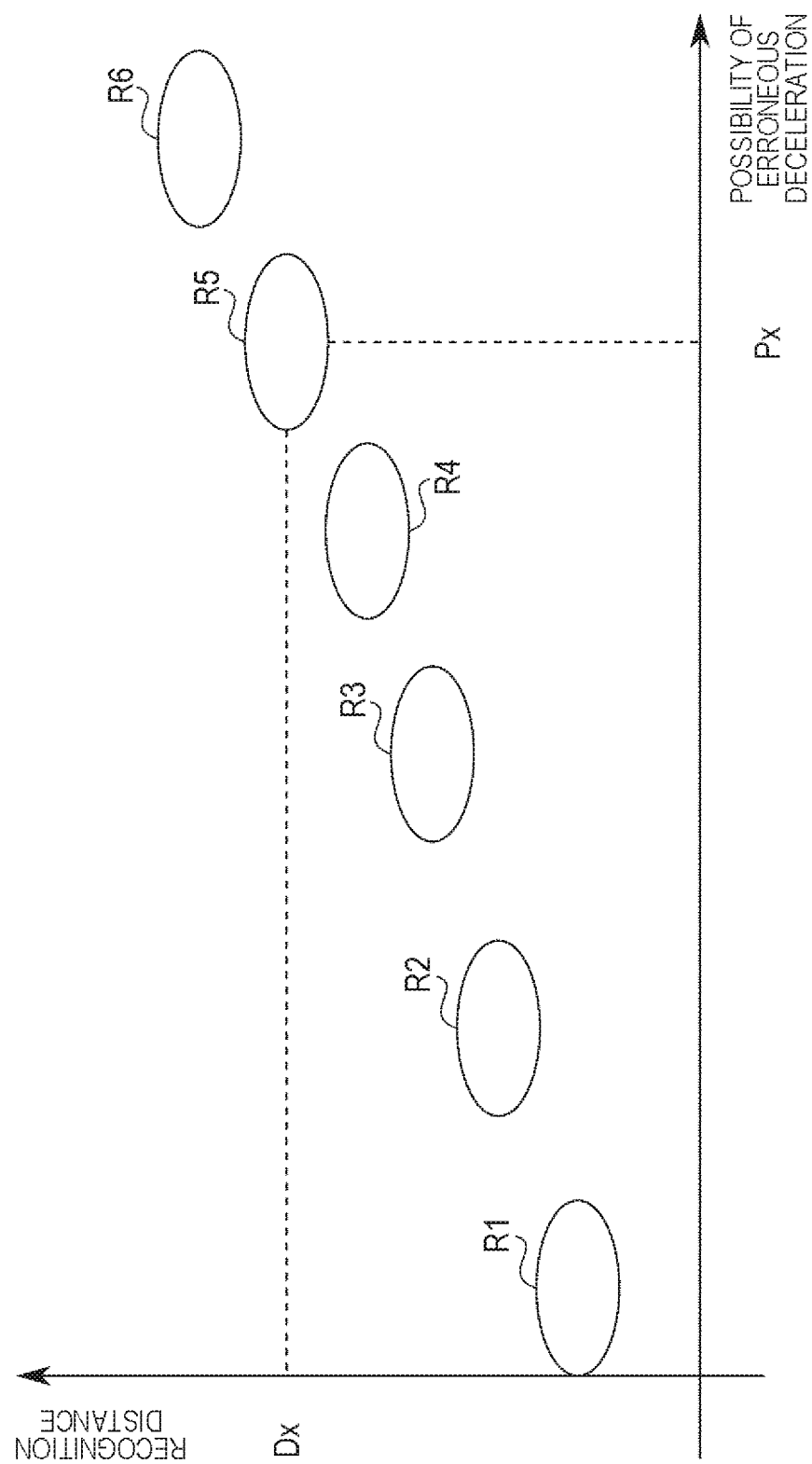
FIG. 8 is a diagram illustrating an adjustment image.

The adjustment image is, for example, a user interface (UI) image as illustrated in FIG. 8.

In the adjustment image of FIG. 8, for example, the relationship between the recognition distance and the possibility of erroneous deceleration related to the object recognition processing of the recognition section 73 is illustrated. In FIG. 8, the vertical axis represents the recognition distance that is the limit distance at which an object can be recognized in the object recognition processing of the recognition section 73, and the horizontal axis represents the possibility of erroneous deceleration that a malfunction may occur when the deceleration operation based on the object recognition result of the recognition section 73 is performed.

Then, R1 to R6 represent characteristics of the recognition section 73 that may be reflected at the time of relearning from the relationship between the recognition distance and the possibility of erroneous deceleration.

In FIG. 8, the characteristics of the recognition section 73 are set to the characteristics R1 to R6 in order of closest recognition distance, and are set to the characteristics R1 to R6 in order of lowest possibility of erroneous deceleration. For example, the characteristics can be selected by a touch panel or the like, and input of a parameter corresponding to the selected characteristic may be received.

That is, in the characteristics of the recognition section 73, the closer the recognition distance is, the higher the recognition accuracy becomes, and thus the lower the possibility of erroneous deceleration becomes. Conversely, in the characteristics of the recognition section 73, the farther the recognition distance is, the lower the recognition accuracy becomes, and thus the higher the possibility of erroneous deceleration becomes.

From this relationship, for example, when the user wants to set the recognition distance to a distance Dx, it is possible to recognize that the possibility of erroneous deceleration is Px. Therefore, in a case where the adjustment image includes a touch panel or the like, the input of the distance Dx as a parameter is received by touching the characteristic R5.

That is, with the adjustment image as illustrated in FIG. 8, the user can set a desired recognition distance from the relationship between the recognition distance and the possibility of erroneous deceleration. For example, in a case where it is desired to lower the possibility of erroneous deceleration at all, the recognition distance is only required to be shortened. Therefore, for example, in the case of the adjustment image of FIG. 8, when the characteristic R1 is selected, the input of the parameter is received.

The adjustment image may express not only the relationship obtained from the recognition distance and the possibility of erroneous deceleration but also characteristics corresponding to various parameters in adjusting the characteristics of the recognition section 73.

Figure 9:
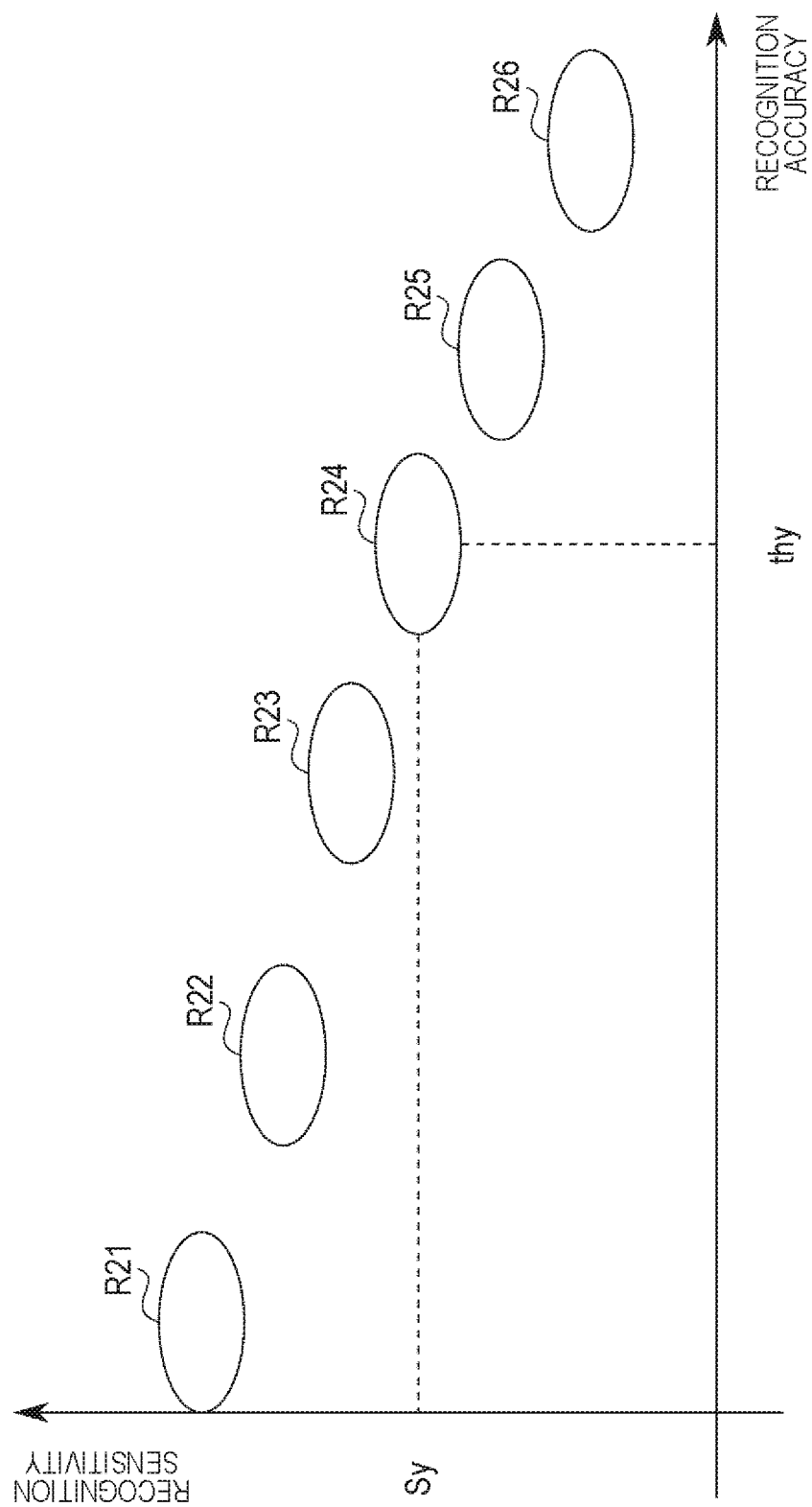
FIG. 9 is a diagram illustrating an adjustment image.

For example, as illustrated in the adjustment image of FIG. 9, the relationship between the recognition sensitivity and the recognition accuracy may be indicated. In FIG. 9, the vertical axis represents the sensitivity to recognize an object related to the object recognition processing in the recognition section 73, and the horizontal axis represents the recognition accuracy related to the object recognition processing in the recognition section 73.

Then, R21 to R26 represent the characteristics of the recognition section 73 at the time of relearning from the relationship between the recognition sensitivity and the recognition accuracy.

For example, in FIG. 9, the characteristics of the recognition section 73 are set to the characteristics R21 to R26 in order of highest recognition sensitivity, and are set to the characteristics R21 to R26 in order of lowest recognition accuracy. For example, the characteristics can be selected by a touch panel or the like, and input of a parameter corresponding to the selected characteristic may be received.

Note that the recognition accuracy can also be considered as a threshold for a value indicating the possibility of being the recognition result of each object in the object recognition processing.

That is, in FIG. 9, in the characteristic of the recognition section 73, the lower the recognition accuracy, that is, the lower the threshold for recognizing a predetermined object, the easier the recognition as a predetermined object, and thus the higher the recognition sensitivity. Conversely, in the characteristic of the recognition section 73, the higher the recognition accuracy, that is, the higher the threshold for recognizing a predetermined object, the more difficult the recognition as a predetermined object, and thus the lower the recognition sensitivity.

From this relationship, for example, when the user wants to set the recognition sensitivity to a sensitivity Sy, it is possible to recognize that the recognition accuracy is thy. Therefore, in a case where the adjustment image includes a touch panel or the like, the input of the sensitivity Sy as a parameter is received by touching the characteristic R24.

That is, with the adjustment image as illustrated in FIG. 9, the user can set a desired recognition sensitivity from the relationship between the recognition sensitivity and the recognition accuracy. For example, in a case where it is desired to increase the recognition accuracy at all, the recognition sensitivity is only required to be lowered. Therefore, for example, in the case of the adjustment image of FIG. 9, when the characteristic R26 is selected, the input of the parameter is received.

The adjustment image is not limited to those illustrated in FIGS. 8 and 9. For example, in the examples of FIGS. 8 and 9, the example of receiving the input of the parameter by selecting the characteristics R1 to R6 or R21 to R26 has been described. However, for example, the parameter may be set by a slide bar, a drop-down list, or the like.

For parameters that the user particularly desires to set, such as the recognition sensitivity and the recognition distance, for example, an input may be received so as to be intuitively adjusted by a slide bar, and parameters such as the possibility of erroneous deceleration that changes secondarily with the input may be displayed only as numerical values.

The detection may be enabled/disabled by inputting only a specific detection target such as an automobile to the check box instead of the parameter.

A reception item of an input to the check box may be received as valid/invalid input only for an object that can be easily visually confirmed, such as an automobile or a street tree, instead of all detection objects, and an input to be invalid may not be received for an object that is likely to be overlooked, such as a pedestrian.

In a case where the input is received in the check box, the high-order conceptual items may be collected in a drop-down list format or a drill down format, and more specific conceptual items may be displayed when the high-order conceptual items are touched.

In this case, for example, when a dynamic object and a static object are set as the high-order conceptual items, a pedestrian, an automobile, a bicycle, and the like may be set as the more specific conceptual items of the dynamic object, and a street tree, a guardrail, and the like may be set as the more specific conceptual items of the static object.

At night, during bad weather, or the like, all targets including automobiles and the like may be always included as detection targets regardless of the input of the user.

As an item of the check box, an item indicating that there are many brake malfunctions for bicycles may be provided, and when this check box is checked, the bicycle detection may be invalidated.

The parameters input during the previous driving may be saved (individually authenticated and set for every user), and in a case where the traveling condition or the environmental condition during the previous driving is different from the traveling condition or the environmental condition during the current driving, the input may be prompted again, or the parameters may be forcibly changed.

The parameter setting may be set according to a traveling condition, an environmental condition, or the like, and for example, an automobile may be excluded from the detection target on a road with good visibility, and an automobile may be included in the detection target under other conditions.

Similarly, the other parameters may be set such that the recognition sensitivity is high and the recognition distance is short in the urban area, and other parameters are further different.

The adjustment content decision section 131 displays the adjustment image of FIG. 8, FIG. 9, or the like according to the parameter selected by the user, so that it is possible to receive an input of a request parameter for relearning that changes to the characteristic of the recognition section 73 desired by the user, and decides the adjustment content at the time of relearning of the recognition section 73 on the basis of the received parameter.

The reception section 251 in the communication section 155 of the server 3 causes the recognition section 73 to relearn on the basis of the vehicle accumulation information transmitted from the data logger 2 and the information of the request parameter that specifies the corresponding adjustment content, and supplies the relearned recognition section 73 to the adjustment determination section 172.

The adjustment determination section 172 executes a simulation related to the automated driving on the basis of the relearned recognition section 73, determines whether or not the relearned recognition section 73 has an adjustment content desired by the user, and outputs the adjustment determination result.

That is, for example, on the basis of a comparison between the characteristics of the recognition section 73 before learning and the relearned recognition section 73, it is determined whether or not a content desired by the user indicating that it is desired to recognize an object that is far to some extent even if the possibility of erroneous deceleration increases, or an adjustment content indicating that it is desired to increase the recognition sensitivity even if the recognition accuracy may be slightly lowered is reflected.

That is, on the basis of the comparison of the characteristics between the recognition section 73 before learning and the relearned recognition section 73, in a case where it is desired to recognize an object that is far to some extent even if the possibility of erroneous deceleration increases which is desired by the user, it is determined whether or not the possibility of erroneous deceleration of the relearned recognition section 73 is the possibility of erroneous deceleration Px according to the recognition distance Dx that is the request parameter.

Furthermore, in a case where it is desired to increase the recognition sensitivity even if the recognition accuracy may be slightly lowered, it is determined whether or not the recognition accuracy of the relearned recognition section 73 is the recognition accuracy thy according to the recognition sensitivity Sy that is the request parameter.

Note that, in any case, at the time of relearning, a variation or the like due to the vehicle accumulation information is included, or in addition, a variation occurs in the characteristics of the relearned recognition section 73 due to the influence of the limit value of the request parameter or the like, and thus, the characteristics illustrated in FIGS. 8 and 9 may not be obtained. Therefore, whether or not the characteristics illustrated in FIGS. 8 and 9 are obtained is confirmed by simulation.

Furthermore, the adjustment determination section 172 verifies not only the characteristics of the recognition section 73 but also whether or not the original object recognition processing is appropriately executed by simulation, and outputs an adjustment determination result including the verification result.

Then, the adjustment determination section 172 generates an update SW for updating to the relearned recognition section 73, and controls the transmission section 252 of the communication section 155 to transmit the update SW and the adjustment determination result together to the data logger 2.

The adjustment determination presentation section 132 of the data logger 2 controls the communication section 115 to present the update SW transmitted from the server 3 and the adjustment determination result to the output section 113 when acquiring the adjustment determination result.

In a case where it is confirmed from the simulation result of the relearned recognition section 73 that it functions as a mechanism that executes the object recognition processing on the basis of the presented adjustment determination result, the adjustment determination presentation section 132 outputs the update SW to the update section 133.

The update section 133 updates the recognition section 73 of the vehicle 1 from the communication line 231 in which the vehicle 1 and the data logger 2 are connected via the mutual interfaces 211 and 221 on the basis of the update SW, and updates the recognition section 73 relearned on the basis of the vehicle accumulation information and the request parameter corresponding to the adjustment content desired by the user.

Furthermore, in a case where it is confirmed from the simulation result of the relearned recognition section 73 that it does not function as a mechanism that executes the object recognition processing, the adjustment determination presentation section 132 presents that the update of the recognition section 73 by the update SW is not possible, and notifies the update section 133 of the fact. In this case, the update section 133 does not update the recognition section 73 of the vehicle 1.

Note that, in a case where the recognition section 73 relearned according to the adjustment determination result does not function as a configuration for executing the object recognition processing and update is not possible, the adjustment content may be decided again, and the server 3 may be caused to execute relearning of the recognition section 73 again.

With the above configuration, the recognition accuracy is improved by the relearning based on the vehicle accumulation information of the recognition section 73, and the adjustment image is presented so that the adjustment content desired by the user can be intuitively selected for the user or the maintenance worker of the store, whereby the adjustment content can be appropriately reflected in the relearning of the recognition section 73.

<Accumulation Processing by Vehicle in FIG. 7>

Figure 10:
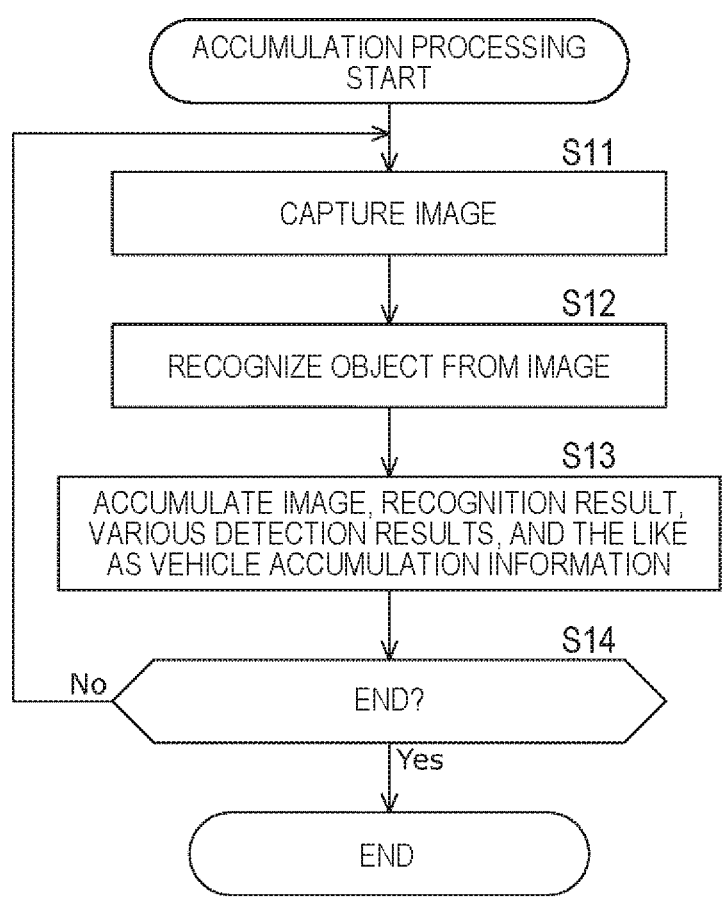
FIG. 10 is a flowchart illustrating accumulation processing by the vehicle in FIG. 7.

Next, accumulation processing of vehicle accumulation information by the vehicle 1 in FIG. 7 will be described with reference to a flowchart in FIG. 10.

In step S11, the camera 51 captures an image around the vehicle 1, and supplies the captured image to the recognition section 73 and the accumulation processing section 201.

In step S12, the recognition section 73 executes object recognition processing on the basis of the image supplied from the camera 51, and supplies a recognition result to the accumulation processing section 201.

Note that the operation control section 63 controls the operation of the vehicle 1 on the basis of the recognition result of the recognition section 73.

In step S13, the accumulation processing section 201 causes the recording section 28 to record the image, the recognition result, and various detection results detected by the external recognition sensor 25 together as the vehicle accumulation information.

In step S14, it is determined whether or not the end of the process has been instructed, and in a case where the end is not instructed, the process returns to step S11.

That is, the processing of steps S11 to S14 is repeated until the end of the process is instructed, and the image capturing, the object recognition processing based on the image, and the accumulation processing of the vehicle accumulation information are repeated.

Then, in a case where the end of the process is instructed in step S14, the process ends.

That is, by the above processing, information of the image captured by the camera 51 in the vehicle 1 and the recognition result of the object recognition processing by the recognition section 73 is sequentially accumulated as vehicle accumulation information together with various sensing results detected by the external recognition sensor 25, and is used as data for learning in relearning of the recognition section 73 in update processing to be described later.

<Update Processing by SW Management System in FIG. 7>

Next, the SW management system update processing of FIG. 7 will be described with reference to the flowchart of FIG. 11.

In step S31, the adjustment content decision section 131 of the data logger 2 determines whether or not the communication line 231 is connected to the interface 221 and is connected to the interface 211 of the vehicle 1, and repeats similar processing until the connection is made. Then, in a case where the connection with the vehicle 1 is confirmed in step S31, the process proceeds to step S32.

In step S32, the adjustment content decision section 131 requests the vehicle 1 for vehicle accumulation information.

In step S51, the output control section 202 of the vehicle 1 determines whether or not the vehicle accumulation information is requested from the data logger 2, and repeats the similar processing until the vehicle accumulation information is requested.

Then, in a case where the vehicle accumulation information is requested in step S51, the process proceeds to step S52.

In step S52, the output control section 202 reads the vehicle accumulation information stored in the recording section 28.

In step S53, the output control section 202 outputs the vehicle accumulation information read from the recording section 28 to the data logger 2 via the communication line 231.

In step S33, the adjustment content decision section 131 acquires the vehicle accumulation information supplied from the vehicle 1 via the communication line 231.

In step S34, the adjustment content decision section 131 requests the input of the request parameter corresponding to the adjustment content requested by the user, and receives the input of the request parameter.

At this time, the adjustment content decision section 131 switches and displays the adjustment image as illustrated in FIGS. 8 and 9 according to the type of the input parameter when the input section 112 is operated by a maintenance worker or the like of the store 5 or directly by the user according to the request of the user, and receives the input of the request parameter input on the basis of the displayed adjustment image.

In step S35, the adjustment content decision section 131 controls the communication section 115 to transmit the vehicle accumulation information and the information of the request parameter to the server 3, and requests relearning of the recognition section 73.

In step S71, the relearning section 171 controls the reception section 251 of the communication section 155 to determine whether or not the vehicle accumulation information and the information of the request parameter are transmitted from the data logger 2 and the relearning of the recognition section 73 is requested, and repeats the similar processing until the relearning is requested.

Then, in step S71, in a case where the vehicle accumulation information and the information of the request parameter are transmitted and relearning of the recognition section 73 is requested, the process proceeds to step S72.

In step S72, the relearning section 171 controls the reception section 251 of the communication section 155 to receive the vehicle accumulation information, the information of the request parameter, and the relearning request of the recognition section 73.

In step S73, the relearning section 171 relearns the recognition section 73 on the basis of the received vehicle accumulation information and the information of the request parameter, and outputs the relearned recognition section 73 to the adjustment determination section 172 together with the request parameter.

In step S74, the adjustment determination section 172 executes simulation on the basis of the relearned recognition section 73.

In step S75, the adjustment determination section 172 determines whether or not the adjustment content having the characteristic corresponding to the request parameter is implemented on the basis of the simulation result, and generates a determination result as an adjustment determination result.

In step S76, the adjustment determination section 172 generates the SW updatable to the relearned recognition section 73 as the update SW, and controls the transmission section 252 of the communication section 155 to output the update SW and the adjustment determination result to the data logger 2.

In step S36, the adjustment determination presentation section 132 controls the communication section 115 to determine whether or not the update SW and the adjustment determination result have been transmitted from the server 3, and repeats similar processing until the update SW and the adjustment determination result are transmitted.

Then, in step S36, in a case where the update SW and the adjustment determination result are transmitted from the server 3, the process proceeds to step S37.

In step S37, the adjustment determination presentation section 132 controls the communication section 115 to receive the update SW and the adjustment determination result.

In step S38, the adjustment determination presentation section 132 controls the output section 113 to present the adjustment determination result. By presenting the adjustment determination result, it is presented whether or not the characteristic of the relearned recognition section 73 has a characteristic according to the request parameter, and the user or the maintenance worker of the store can recognize whether or not the characteristic corresponding to the request parameter is obtained.

In step S39, the adjustment determination presentation section 132 determines whether or not there is a problem in updating the recognition section 73 such that the characteristic of the relearned recognition section 73 does not conform to the request parameter in the adjustment determination result or it cannot function as a mechanism for executing the object recognition processing or the like.

In a case where it is determined in step S39 that there is no problem in updating the recognition section 73, the process proceeds to step S40.

In step S40, the adjustment determination presentation section 132 supplies the update SW to the update section 133 and instructs the update of the recognition section 73 of the vehicle 1. On the basis of this instruction, the update section 133 updates the recognition section 73 of the vehicle 1 to have the relearned characteristic by the update SW.

In response to this, in the vehicle 1, in step S54, it is determined whether or not the recognition section 73 is updated. Here, it is assumed that the recognition section 73 is updated by being updated by the update section 133, and the process proceeds to step S55.

In step S55, the recognition section 73 is updated by the update section 133 performing the update processing using the update SW.

Meanwhile, in a case where it is determined in step S39 that there is a problem in updating the recognition section 73, the process proceeds to step S41.

In step S41, the adjustment determination presentation section 132 controls the output section 113 to present that the recognition section 73 cannot be updated, inputs the request parameter again, and presents an image for asking whether or not to request relearning again.

In step S42, the adjustment determination presentation section 132 determines whether or not to request relearning by operating the input section 112 and inputting the request parameter.

In step S42, in a case where it is determined that there is an input indicating that relearning is requested again, the process returns to step S34, the request parameter is input again, and relearning is performed.

Furthermore, in step S42, in a case where relearning is not requested again, the process ends.

At this time, since the recognition section 73 is not updated, it is determined in step S54 that the recognition section 73 is not updated, so that the processing in step S55 is skipped and the recognition section 73 is not updated.

By the series of processing described above, when the vehicle 1 is brought to the store 5 and connected to the data logger 2, the vehicle adjustment information is extracted and the input of the request parameter related to the update of the recognition section 73 is received.

At this time, the relationship between the request parameter and the characteristic of the recognition section 73 in a case where it is relearned according to the request parameter is presented for each type of the request parameter, whereby the request parameter can be set according to the presentation content, and the user, the maintenance worker of the store, or the like can improve the recognition accuracy and adjust the characteristic to be a characteristic desired by the user in the relearning of the recognition section 73.

Moreover, regarding the relearned recognition section 73, simulation is performed, and whether or not the characteristic corresponding to the request parameter has been obtained and whether or not the function is disrupted are obtained as an adjustment determination result and presented to the user, a maintenance worker of the store, or the like, so that it is possible to appropriately confirm whether or not the characteristic desired by the user has been obtained.

Furthermore, in a case where the relearned recognition section 73 does not appropriately operate or the characteristic desired by the user is not obtained as the adjustment determination result, the recognition section 73 is not updated, and thus, it is possible to prevent inappropriate update.

Moreover, as an adjustment determination result, it is possible to repeatedly input the request parameter again until the relearned recognition section 73 operates appropriately and the characteristic desired by the user is obtained.

In any case, as a result, the update of the recognition section 73 including the software program (SW) can be implemented by easy adjustment so as to have the update content according to the request of the user.

Note that, although the example in which the recognition section 73 is relearned on the basis of the request parameter and the vehicle accumulation information has been described above, in this case, the relationship between the parameter and the characteristic of the recognition section 73 at the time of relearning as illustrated in FIGS. 8 and 9 may vary depending on the vehicle accumulation information, and thus the characteristic as in the adjustment image may not be obtained.

However, relearning of the recognition section 73 may be performed in advance on the basis of various parameters, and relearned recognition sections 73 corresponding to various request parameters may be held in advance in the data logger 2 or the server 3.

In this case, by setting the request parameter in the adjustment image as illustrated in FIGS. 8 and 9, it is practically possible to select the recognition section 73 corresponding to the request parameter among the recognition sections 73 relearned in advance. Therefore, by executing adjustment determination by simulation in advance, it is possible to select the relearned recognition section 73 having no functional problem.

Furthermore, in a case where the recognition section 73 relearned in advance on the basis of a plurality of parameters is held, by selecting the characteristics R1 to R6 or R21 to R26 illustrated in FIGS. 8 and 9, the recognition section 73 relearned with the corresponding parameters may be selected and used for update.

As a result, it is possible to omit the relearning process at the time of updating the recognition section 73, and thus, it is possible to quickly implement the processing.

Furthermore, if the simulation has been performed in advance, the simulation processing can also be omitted, so that the processing can be further speeded up.

Moreover, since an adjustment determination result by simulation is also obtained in advance, selectable request parameters and (the recognition section 73 of) characteristics may be presented and selected.

3. Second Embodiment

Although the example in which the simulation of the relearned recognition section 73 is executed and the adjustment determination result is obtained in the server 3 has been described above, the simulation of the relearned recognition section 73 may be executed in the data logger 2 and the adjustment determination result may be obtained.

Figure 12:
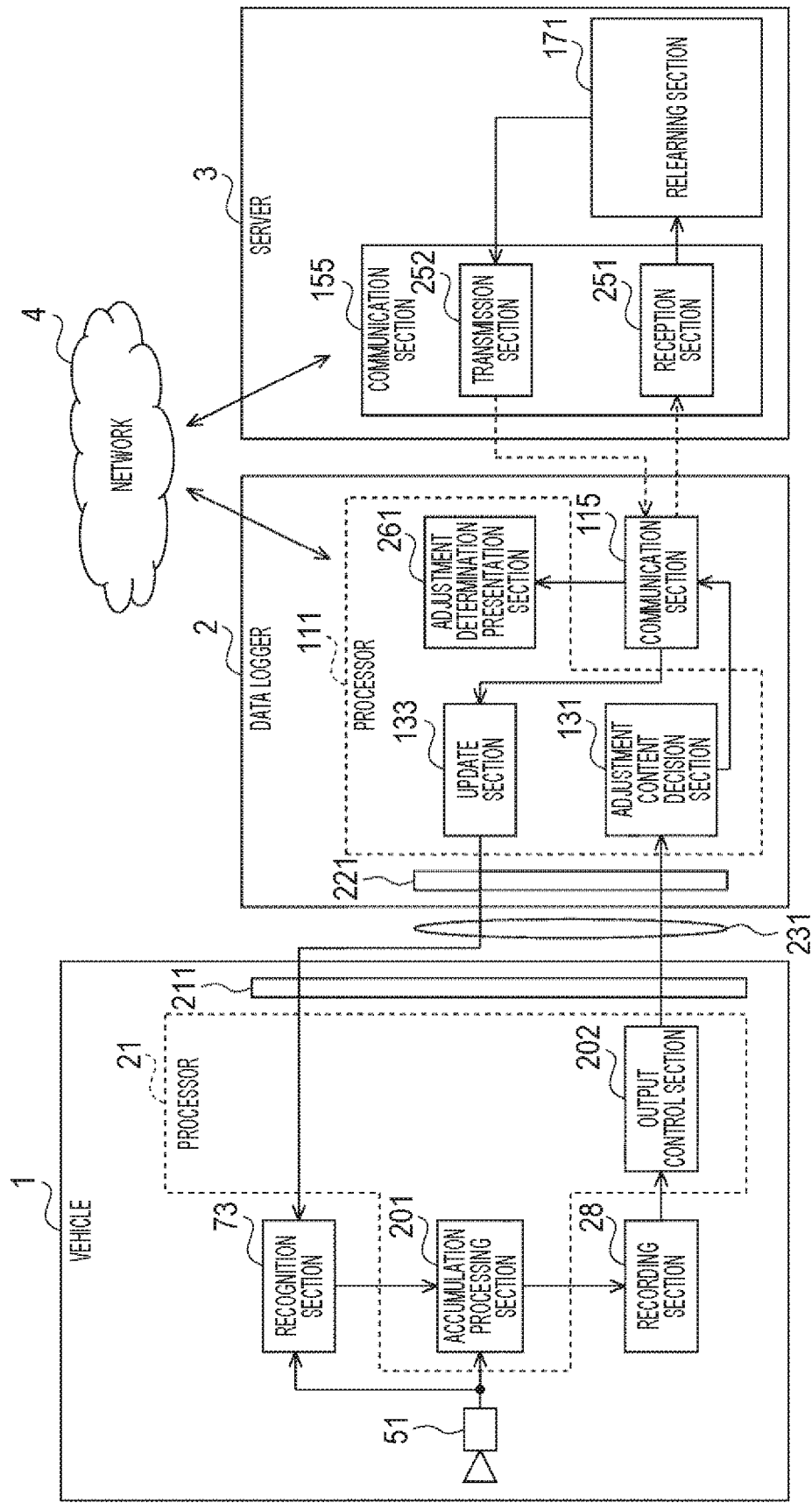
FIG. 12 is a functional block diagram illustrating a second embodiment of functions implemented by the SW management system in FIG. 2.

FIG. 12 illustrates functions implemented by an SW management system in which a simulation of the relearned recognition section 73 is executed in the data logger 2 and an adjustment determination result is obtained.

Note that, in FIG. 12, configurations having the same functions as those in FIG. 7 are denoted by the same reference numerals, and the description thereof will be appropriately omitted.

That is, FIG. 12 is different from FIG. 7 in that the adjustment determination section 172 is deleted in the server 3, and an adjustment determination presentation section 261 is provided in the data logger 2 instead of the adjustment determination presentation section 132.

That is, the adjustment determination presentation section 261 further includes a function of obtaining an adjustment determination result by executing a simulation of the relearned recognition section 73 in addition to the function of the adjustment determination presentation section 132.

<Update Processing by SW Management System in FIG. 12>

Next, the SW management system update processing of FIG. 7 will be described with reference to the flowchart of FIG. 13.

Figure 11:
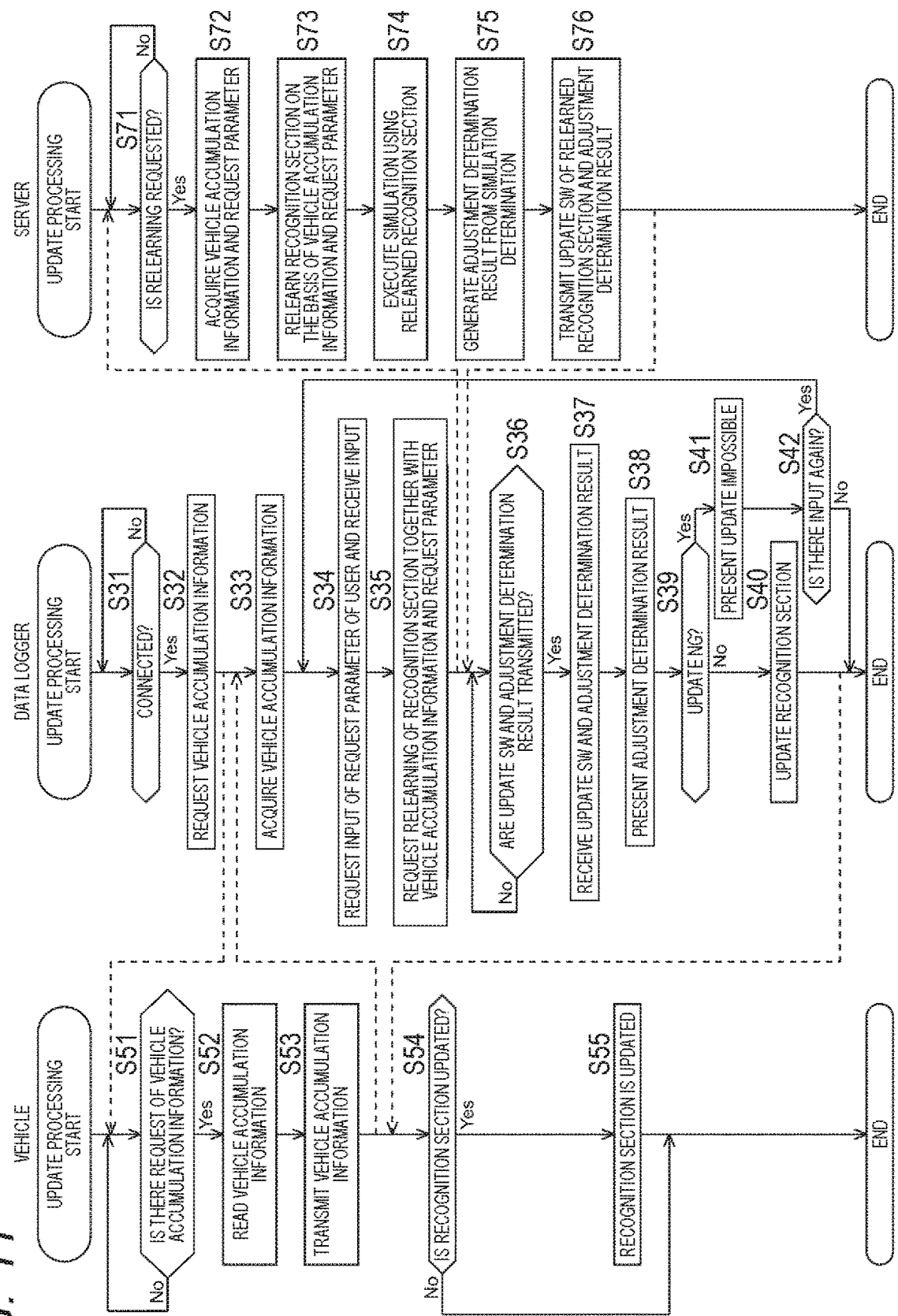
FIG. 11 is a flowchart illustrating update processing implemented by the SW management system in FIG. 7.
Figure 13:
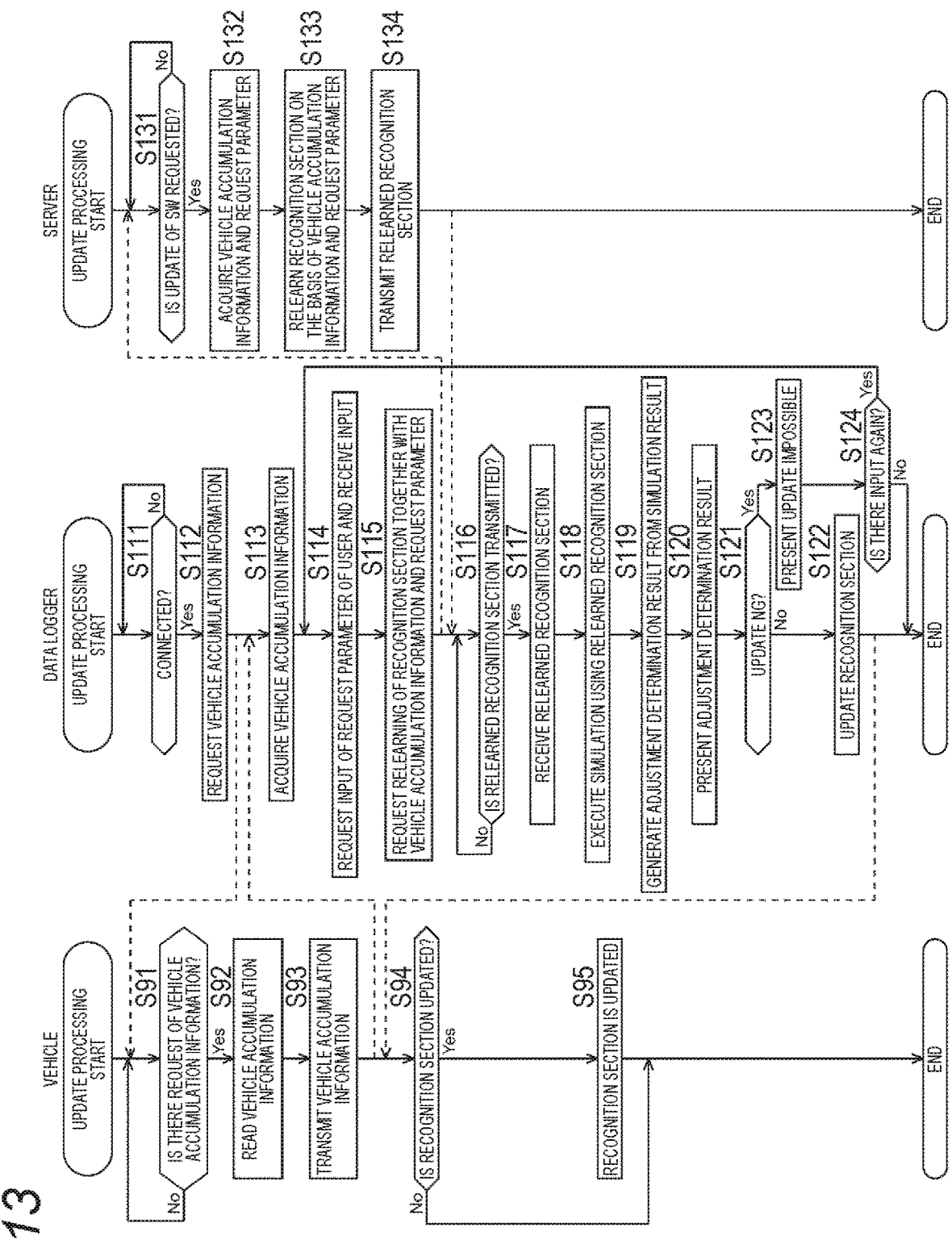
FIG. 13 is a flowchart illustrating update processing implemented by the SW management system in FIG. 12.

Note that the processing of steps S91 to 95 and the processing of steps S111 to S115 in the flowchart of FIG. 13 are similar to the processing of steps S51 to S55 and the processing of steps S31 to S35 in the flowchart of FIG. 11, and thus, description thereof is omitted.

That is, in step S115, the adjustment content decision section 131 controls the communication section 115 to transmit the vehicle accumulation information and the information of the request parameter to the server 3, and requests relearning of the recognition section 73.

In step S131, the relearning section 171 controls the reception section 251 of the communication section 155 to determine whether or not the vehicle accumulation information and the information of the request parameter are transmitted from the data logger 2 and the relearning of the recognition section 73 is requested, and repeats the similar processing until the relearning is requested.

Then, in step S131, in a case where the vehicle accumulation information and the information of the request parameter are transmitted and relearning of the recognition section 73 is requested, the process proceeds to step S132.

In step S132, the relearning section 171 controls the reception section 251 of the communication section 155 to receive the vehicle accumulation information, the information of the request parameter, and the relearning request of the recognition section 73.

In step S133, the relearning section 171 relearns the recognition section 73 on the basis of the received vehicle accumulation information and information of the request parameter.

In step S134, the relearning section 171 controls the transmission section 252 of the communication section 155 to output the relearned recognition section 73 to the data logger 2.

In step S116, the adjustment determination presentation section 261 controls the communication section 115 to determine whether or not the relearned recognition section 73 is transmitted from the server 3, and repeats similar processing until the relearned recognition section is transmitted.

Then, in step S116, in a case where the relearned recognition section 73 is transmitted from the server 3, the process proceeds to step S117.

In step S117, the adjustment determination presentation section 261 controls the communication section 115 to receive the relearned recognition section 73.

In step S118, the adjustment determination presentation section 261 executes simulation on the basis of the relearned recognition section 73.

In step S119, the adjustment determination presentation section 261 determines whether or not the adjustment content having the characteristic corresponding to the request parameter is implemented and whether or not there is a problem in the function as the recognition section 73 on the basis of the simulation result, and generates a determination result as an adjustment determination result.

In step S120, the adjustment determination presentation section 261 controls the output section 113 to present an adjustment determination result.

In step S121, the adjustment determination presentation section 261 determines, on the basis of the adjustment determination result, whether or not there is a problem in updating the recognition section 73, such as whether the characteristic of the relearned recognition section 73 does not conform to the request parameter or the function is disrupted or the like.

In a case where it is determined in step S121 that there is no problem in updating the recognition section 73, the process proceeds to step S122.

In step S122, the adjustment determination presentation section 261 supplies the update SW to the update section 133 and instructs the update of the recognition section 73 of the vehicle 1. On the basis of this instruction, the update section 133 updates the recognition section 73 of the vehicle 1 to have the relearned characteristic by the update SW.

Meanwhile, in a case where it is determined in step S121 that there is a problem in updating the recognition section 73, the process proceeds to step S123.

In step S123, the adjustment determination presentation section 261 controls the output section 113 to present that the recognition section 73 cannot be updated, inputs the request parameter again, and presents an image for asking whether or not to request relearning again.

In step S124, the adjustment determination presentation section 261 determines whether or not to request relearning by operating the input section 112 and inputting the request parameter again.

In step S124, in a case where it is determined that there is an input indicating that relearning is requested again, the process returns to step S114, the request parameter is input again, and relearning is performed.

Furthermore, in step S124, in a case where relearning is not requested again, the process ends.

Also in the series of processing described above, as a result, the update of the recognition section 73 including the software program (SW) can be implemented by easy adjustment so as to have the update content according to the request of the user.

4. Third Embodiment

<Function Implemented by Vehicle 1 Including Bottom Recognition Section>

Although the example in which the image captured by the camera 51 and the recognition result of the recognition section 73 are accumulated as the vehicle accumulation information in the vehicle 1 has been described above, a recognition section (hereinafter, referred to as a bottom recognition section) that is not intended for the object recognition processing and in which the recognition performance is guaranteed to some extent is provided separately from the recognition section 73, and whether or not appropriate recognition processing has been performed is obtained as the recognition performance by comparing the recognition section 73 with the recognition result.

Then, in addition to the vehicle accumulation information including the image captured by the camera 51 and the recognition result of the recognition section 73, the recognition performance may be used for relearning, so that in a case where it can be considered that the difference between the comparison results of both is large and the degradation of the performance is large, it can be recognized that it is a situation to be reinforced in the relearning.

Figure 14:
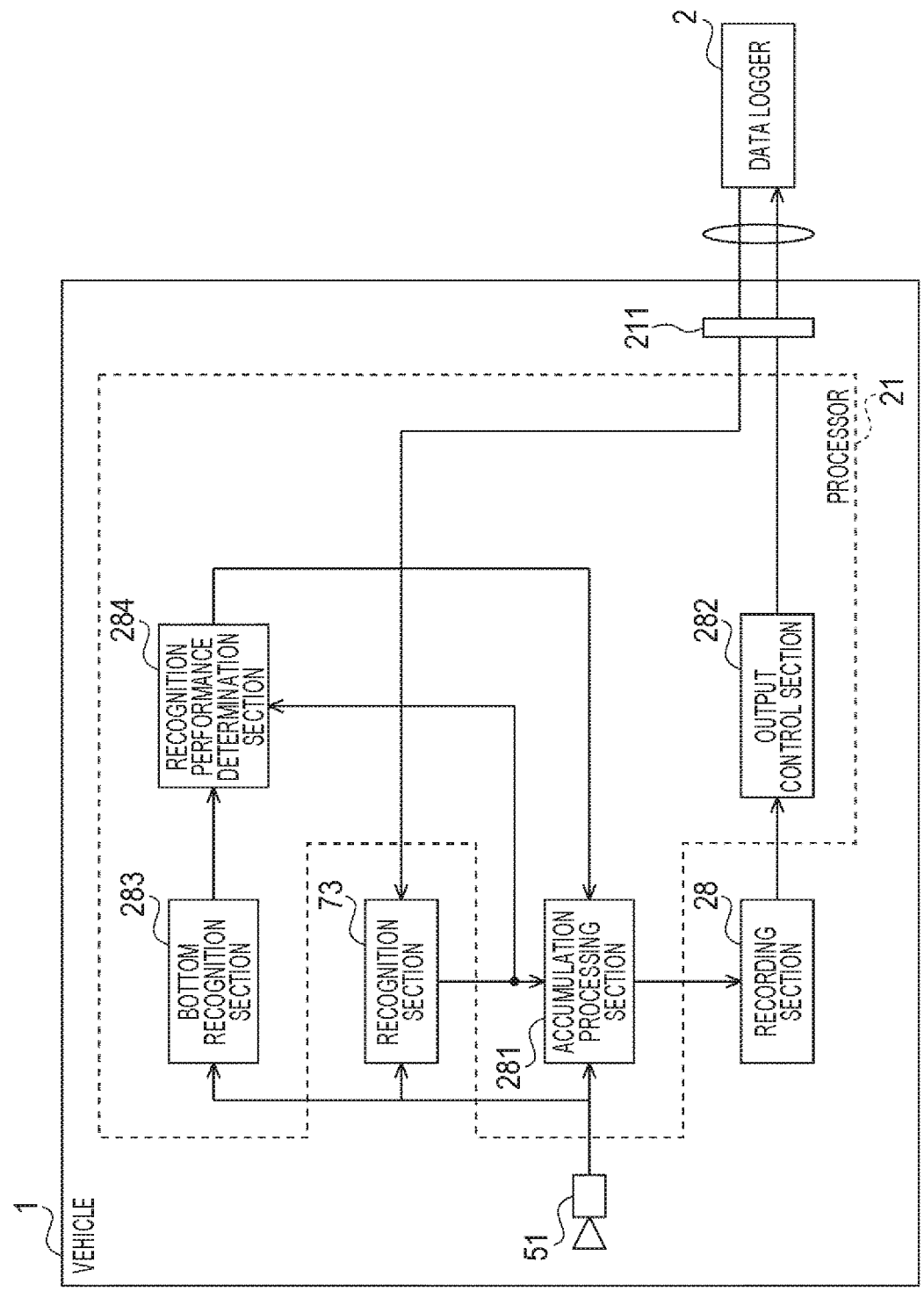
FIG. 14 is a functional block diagram illustrating a third embodiment of functions implemented by the vehicle 1 in FIG. 2.

FIG. 14 illustrates a configuration example of the vehicle 1 including the bottom recognition section.

The vehicle 1 of FIG. 14 is different from the vehicle 1 of FIG. 7 in that an accumulation processing section 281 and an output control section 282 are provided instead of the accumulation processing section 201 and the output control section 202, and a bottom recognition section 283 and a recognition performance determination section 284 are newly provided.

Note that the basic functions of the accumulation processing section 281 and the output control section 282 are the same as those of the accumulation processing section 201 and the output control section 202, and thus the description thereof will be omitted.

The bottom recognition section 283 has the same basic function as the recognition section 73, but with respect to its performance, predetermined performance is guaranteed, and executes object recognition processing on the basis of an image captured by the camera 51 and outputs a recognition result to the recognition performance determination section 284.

The recognition performance determination section 284 compares the recognition result of the recognition section 73 with the recognition result of the bottom recognition section 283, obtains recognition performance on the basis of the comparison result, and outputs the recognition performance to the accumulation processing section 281.

The accumulation processing section 281 causes the recording section 28 to record the information of the recognition performance together with the vehicle accumulation information.

Then, the output control section 282 outputs information of the recognition performance to the data logger 2 in addition to the vehicle accumulation information.

Note that, in the data logger 2 and the server 3, basic processing is similar, but processing is performed in a state where the recognition performance is always added in the processing for the vehicle accumulation information, and processing in which the information of the recognition performance is added to the vehicle accumulation information and the request parameter is also performed in the relearning of the recognition section 73.

In the relearning of the recognition section 73, since the recognition performance is added to the vehicle accumulation information and the request parameter, the relearning can be performed while recognizing a situation or the like in which the recognition performance deteriorates, and thus, more appropriate relearning can be performed.

<Accumulation Processing by Vehicle in FIG. 14>

Figure 15:
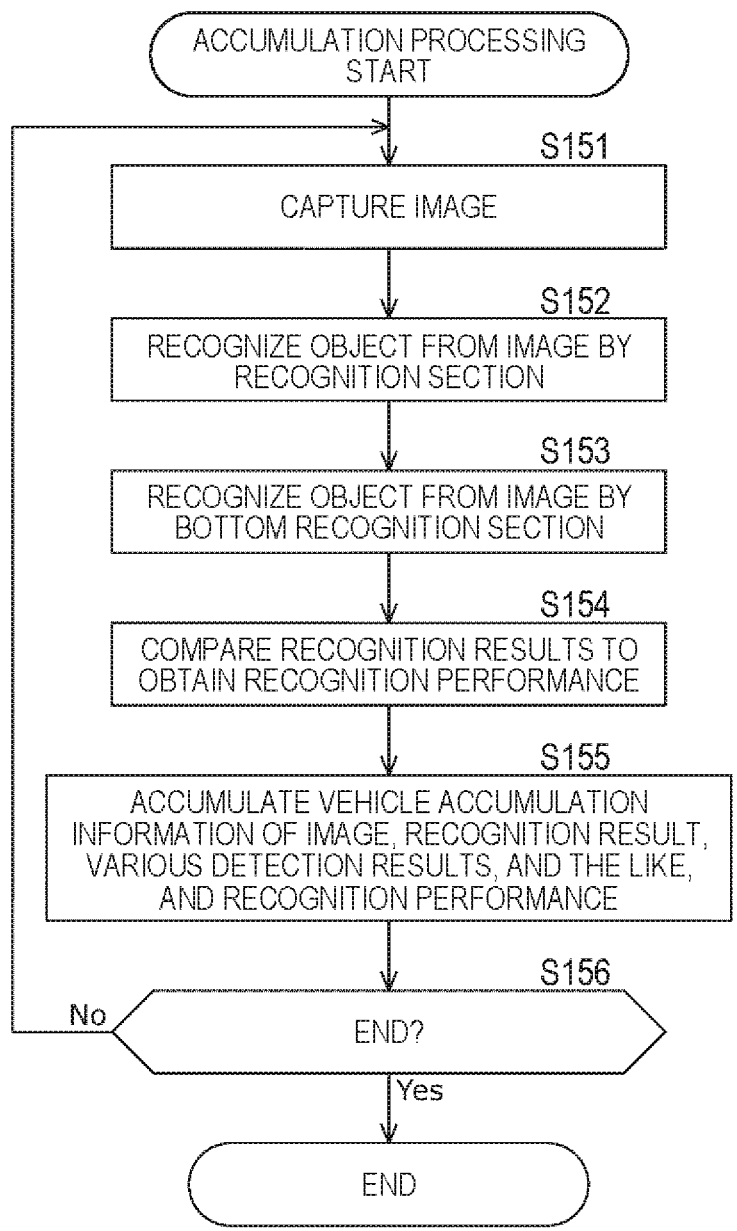
FIG. 15 is a flowchart illustrating accumulation processing by the vehicle in FIG. 14.

Next, accumulation processing of vehicle accumulation information by the vehicle 1 in FIG. 14 will be described with reference to a flowchart in FIG. 15.

In step S151, the camera 51 captures an image around the vehicle 1, and supplies the captured image to the recognition section 73, the accumulation processing section 281, and the bottom recognition section 283.

In step S152, the recognition section 73 executes object recognition processing on the basis of the image supplied from the camera 51, and supplies a recognition result to the accumulation processing section 281 and the recognition performance determination section 284.

In step S153, the bottom recognition section 283 executes object recognition processing on the basis of the image supplied from the camera 51, and supplies a recognition result to the recognition performance determination section 284.

In step S154, the recognition performance determination section 284 determines the recognition performance of the recognition section 73 from the comparison between the recognition result of the recognition section 73 and the recognition result of the bottom recognition section 283, and supplies information of the recognition performance as the determination result to the accumulation processing section 281.

In step S155, the accumulation processing section 201 causes the recording section 28 to record the information of the recognition performance in addition to the vehicle accumulation information including the image, the recognition result, and various detection results detected by the external recognition sensor 25.

In step S156, it is determined whether or not the end of the process has been instructed, and in a case where the end is not instructed, the process returns to step S151.

That is, the processing of steps S151 to S156 is repeated until the end of the process is instructed, and the image capturing, the object recognition processing, the recognition performance determination processing, and the accumulation processing of the vehicle accumulation information and the recognition performance are repeated.

Then, in a case where the end of the process is instructed in step S156, the process ends.

That is, by the above processing, in addition to the vehicle accumulation information including the image captured by the camera 51 in the vehicle 1, the recognition result of the object recognition processing by the recognition section 73, and various sensing results detected by the external recognition sensor 25, the information of the recognition performance of the recognition section 73 is sequentially accumulated, and is used as the data for learning in the relearning of the recognition section 73 in the update processing to be described later.

Note that an example has been described in which the bottom recognition section 283 is used to execute the object recognition processing in order to confirm whether or not the recognition performance of the recognition section 73 after the update is deteriorated, and the recognition result is used as a comparison target. However, since it is only necessary to confirm whether or not the recognition performance of the recognition section 73 after the update is deteriorated, the object recognition processing may be executed using the recognition section 73 before the update instead of the bottom recognition section 283, and the recognition result may be used as a comparison target.

<Update Processing of Recognition Section Using Vehicle Accumulation Information and Recognition Performance>

Figure 16:
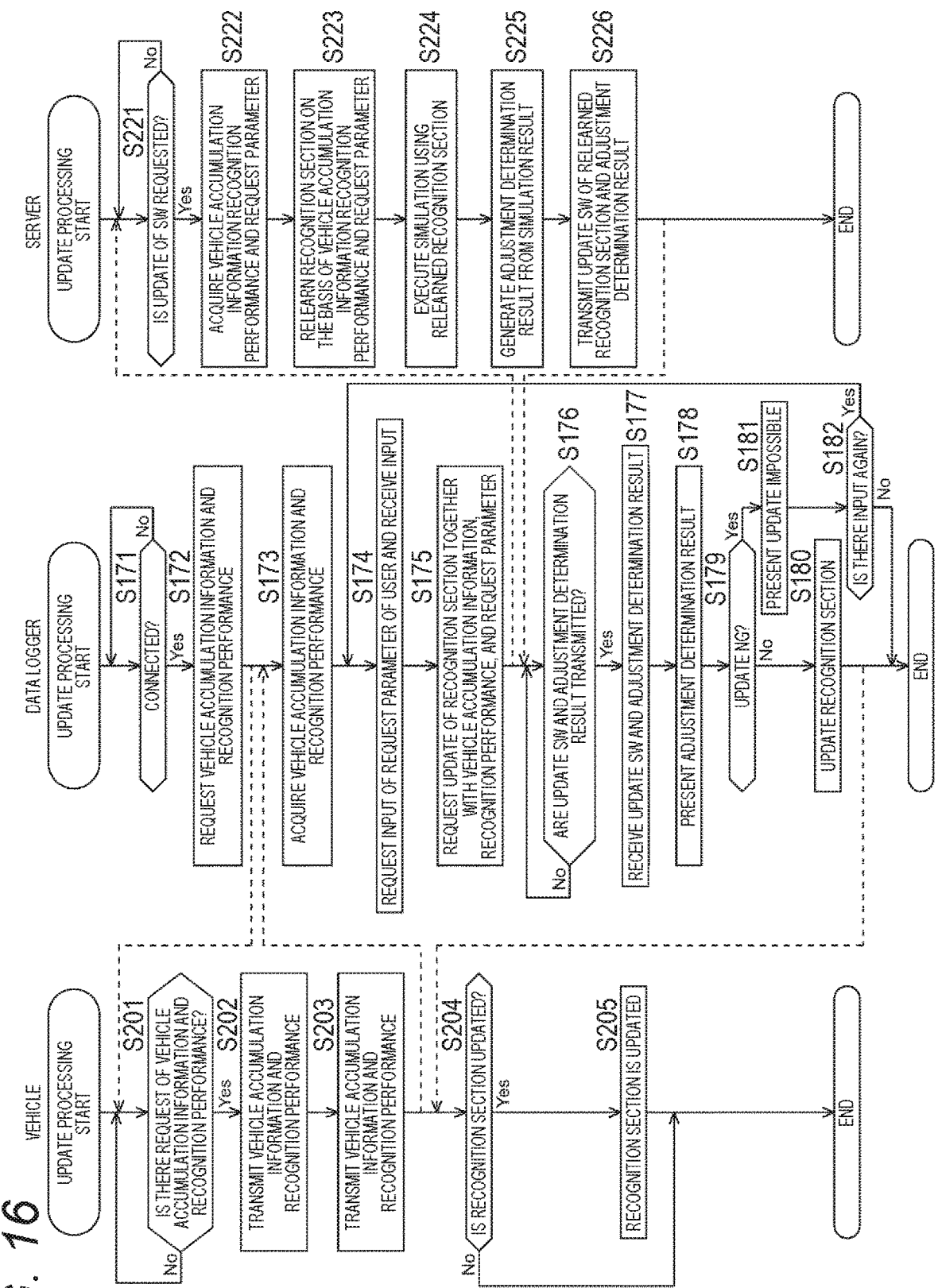
FIG. 16 is a flowchart illustrating update processing implemented by the SW management system in FIG. 14.

Next, update processing of the SW management system including the vehicle 1 of FIG. 14 will be described with reference to a flowchart of FIG. 16. Note that the configurations of the data logger 2 and the server 3 are the same as those in the SW management system of FIG. 7.

That is, in step S171, the adjustment content decision section 131 of the data logger 2 determines whether or not the communication line 231 is connected to the interface 221 and is connected to the vehicle 1, and repeats similar processing until the connection is made. Then, when the connection to the vehicle 1 is established in step S171, the process proceeds to step S172.

In step S172, the adjustment content decision section 131 requests the vehicle 1 for vehicle accumulation information.

In step S201, the output control section 282 of the vehicle 1 determines whether or not the vehicle accumulation information is requested from the data logger 2, and repeats the similar processing until the vehicle accumulation information is requested.

Then, in a case where the vehicle accumulation information is requested in step S201, the process proceeds to step S202.

In step S202, the output control section 282 reads the vehicle accumulation information and the recognition performance stored in the recording section 28.

In step S203, the output control section 282 outputs the vehicle accumulation information and the recognition performance read from the recording section 28 to the data logger 2.

In step S173, the adjustment content decision section 131 acquires the vehicle accumulation information and the recognition performance supplied from the vehicle 1.

In step S174, the adjustment content decision section 131 requests the input of the request parameter corresponding to the adjustment content requested by the user, and receives the input of the request parameter.

In step S175, the adjustment content decision section 131 controls the communication section 115 to transmit the vehicle accumulation information, the recognition performance, and the information of the request parameter to the server 3, and requests relearning of the recognition section 73.

In step S221, the relearning section 171 controls the reception section 251 of the communication section 155 to determine whether or not the vehicle accumulation information, the recognition performance, and the information of the request parameter are transmitted from the data logger 2 and the relearning of the recognition section 73 is requested, and repeats the similar processing until the relearning is requested.

Then, in step S221, in a case where the vehicle accumulation information, the recognition performance, and the information of the request parameter are transmitted and relearning of the recognition section 73 is requested, the process proceeds to step S222.

In step S222, the relearning section 171 controls the reception section 251 of the communication section 155 to receive the vehicle accumulation information, the recognition performance, and the information of the request parameter, and the relearning request of the recognition section 73.

In step S223, the relearning section 171 relearns the recognition section 73 on the basis of the received vehicle accumulation information, the recognition performance, and the request parameter information, and outputs the relearned recognition section 73 to the adjustment determination section 172 together with the request parameter.

That is, here, the relearning section 171 relearns the recognition section 73 on the basis of the received vehicle accumulation information, the recognition performance, and the information of the request parameter such that the recognition performance can be improved particularly for the vehicle accumulation information in a situation where the recognition performance is lower than that of the bottom recognition section 283.

Hereinafter, similarly to the processing of FIG. 11, in steps S224 to S226, a simulation is executed on the basis of the relearned recognition section 73, an adjustment determination result is generated on the basis of the simulation result, and the adjustment determination result is output to the data logger 2 together with the update SW.

Furthermore, an adjustment determination result is presented by the processing of steps S176 to S182 and the processing of steps S204 and S205, and the recognition section 73 is updated on the basis of the adjustment determination result.

As a result, the update of the recognition section 73 including the software program (SW) can be implemented by easy adjustment so as to have the update content according to the request of the user.

In this example, since relearning based on the information of the recognition performance is performed on the recognition section 73, it is possible to reinforce a situation in which the recognition performance is likely to deteriorate as a characteristic of the recognition section 73 by performing relearning while recognizing a situation in which the recognition accuracy is likely to deteriorate from the comparison with the recognition result of the bottom recognition section 283.

Note that, in the above description, in the accumulation processing of the vehicle 1, an example has been described in which the recognition performance determination section 284 requires the recognition performance according to the comparison between the recognition result of the bottom recognition section 283 and the recognition result of the recognition section 73. However, the recognition result of the bottom recognition section 283 and the recognition result of the recognition section 73 may not be compared, and both pieces of information may be directly accumulated as the information of the recognition performance.

In this case, at the time of relearning, the recognition result of the bottom recognition section 283 and the recognition result of the recognition section 73 are used as performance information in addition to the vehicle accumulation information and the request parameter, and the recognition section 73 is relearned.

Also in this case, in the relearning section 171, the relationship between the recognition result of the bottom recognition section 283 and the recognition result of the recognition section 73 is reflected in the relearning of the recognition section 73, and thus, it is possible to implement the relearning to reinforce the situation in which the recognition section 73 is deteriorated in the recognition processing with respect to the bottom recognition section 283.

Moreover, the bottom recognition section 283 may be the recognition section 73 before the update. As a result, the relationship between the recognition section 73 before the update and the relearned recognition section 73 after the update is obtained for the relationship between the recognition result of the bottom recognition section 283 and the recognition result of the recognition section 73, and it is possible to implement the relearning for reinforcing the situation in which the recognition performance is deteriorated than the recognition section 73 before the update in the recognition section 73 after the update.

5. Example Executed by Software

Meanwhile, the above-described series of processing can be executed by hardware, but can also be executed by software. In a case where the series of processing is executed by software, a program configuring the software is installed from a recording medium to a computer incorporated in dedicated hardware or, for example, a general-purpose computer or the like capable of executing various functions by installing various programs.

Figure 17:
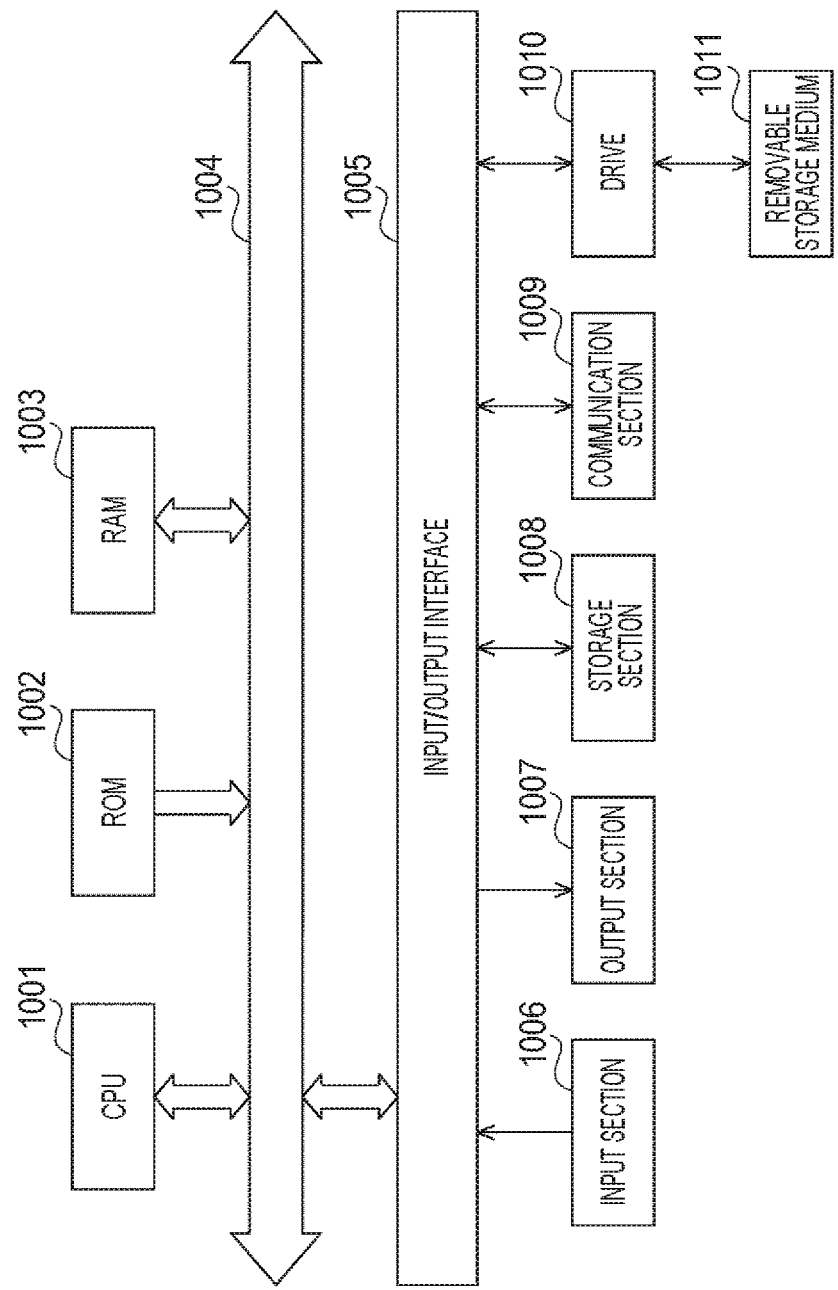
FIG. 17 is a diagram illustrating a configuration example of a general-purpose computer.

FIG. 17 illustrates a configuration example of a general-purpose computer. The personal computer includes a central processing unit (CPU) 1001. An input/output interface 1005 is connected to the CPU 1001 via a bus 1004. A read only memory (ROM) 1002 and a random access memory (RAN) 1003 are connected to the bus 1004.

The input/output interface 1005 is connected with an input section 1006 including an input device such as a keyboard or a mouse with which a user inputs an operation command, an output section 1007 that outputs an image of a processing operation screen or a processing result to a display device, a storage section 1008 including a hard disk drive or the like that stores a program or various data, and a communication section 1009 including a local area network (LAN) adapter or the like that executes communication processing via a network represented by the Internet. Furthermore, a drive 1010 that reads and writes data from and to a removable storage medium 1011 such as a magnetic disk (including a flexible disk), an optical disk (including a compact disc-read only memory (CD-ROM) and a digital versatile disc (DVD)), a magneto-optical disk (including a mini disc (MD)), a semiconductor memory, or the like is connected.

The CPU 1001 executes various processes according to a program stored in the ROM 1002 or a program read from the removable storage medium 1011 such as a magnetic disk, an optical disk, a magneto-optical disk, a semiconductor memory, or the like, installed in the storage section 1008, and loaded from the storage section 1008 to the RAM 1003. The RAM 1003 also appropriately stores data and the like necessary for the CPU 1001 to execute various processes.

In the computer configured as described above, for example, the CPU 1001 loads a program stored in the storage section 1008 into the RAM 1003 via the input/output interface 1005 and the bus 1004 and executes the program, whereby the above-described series of processing is performed.

The program executed by the computer (CPU 1001) can be provided by being recorded in the removable storage medium 1011 as a package medium or the like, for example. Furthermore, the program can be provided via a wired or wireless transmission medium such as a local area network, the Internet, or digital satellite broadcasting.

In the computer, the program can be installed in the storage section 1008 via the input/output interface 1005 by attaching the removable storage medium 1011 to the drive 1010. Furthermore, the program can be received by the communication section 1009 via a wired or wireless transmission medium and installed in the storage section 1008. In addition, the program can be installed in the ROM 1002 or the storage section 1008 in advance.

Note that the program executed by the computer may be a program in which processing is performed in time series in the order described in the present specification, or may be a program in which processing is performed in parallel or at necessary timing such as when a call is made or the like.

Figure 5:
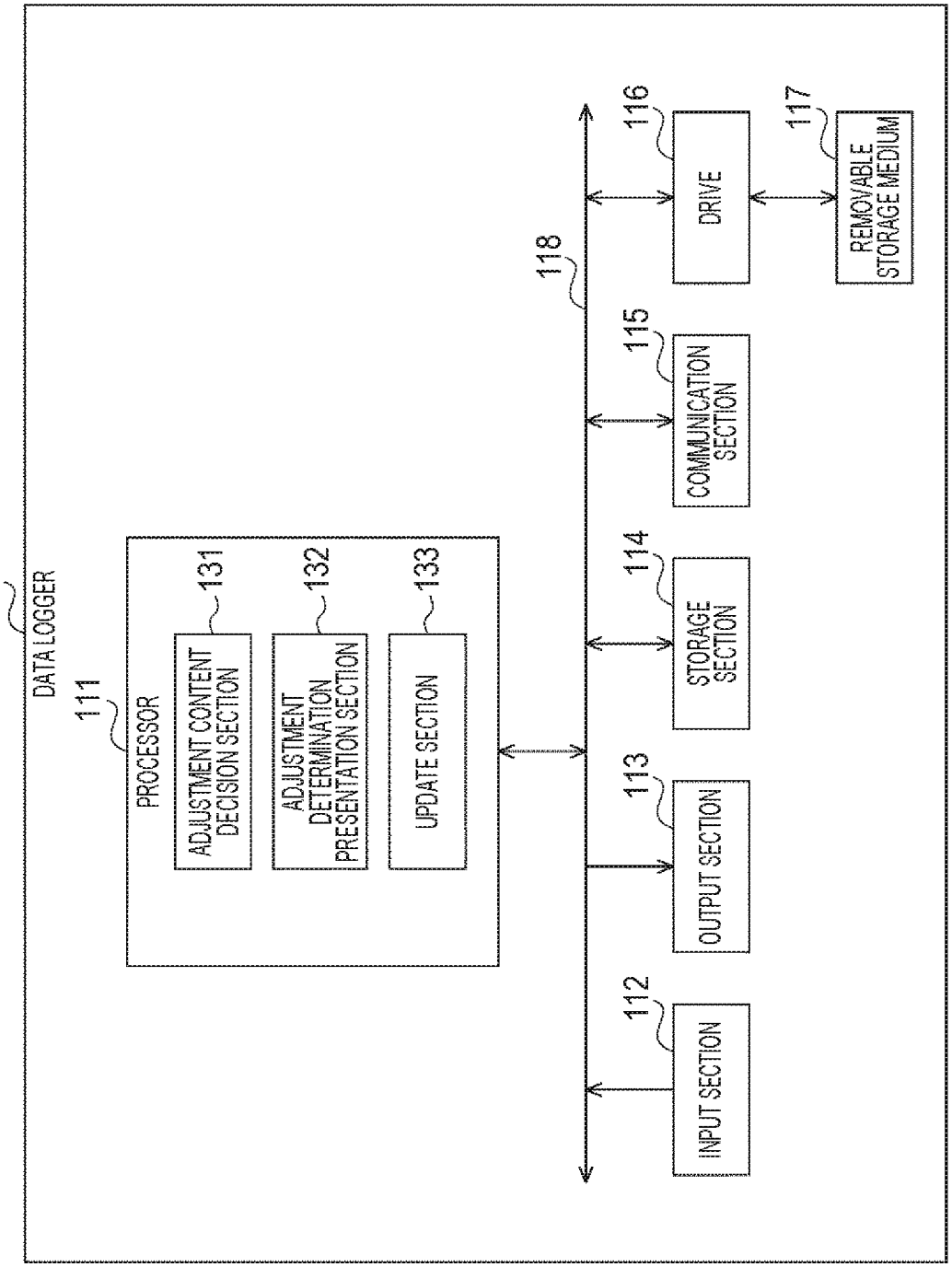
FIG. 5 is a block diagram illustrating a configuration example of a data logger.
Figure 6:
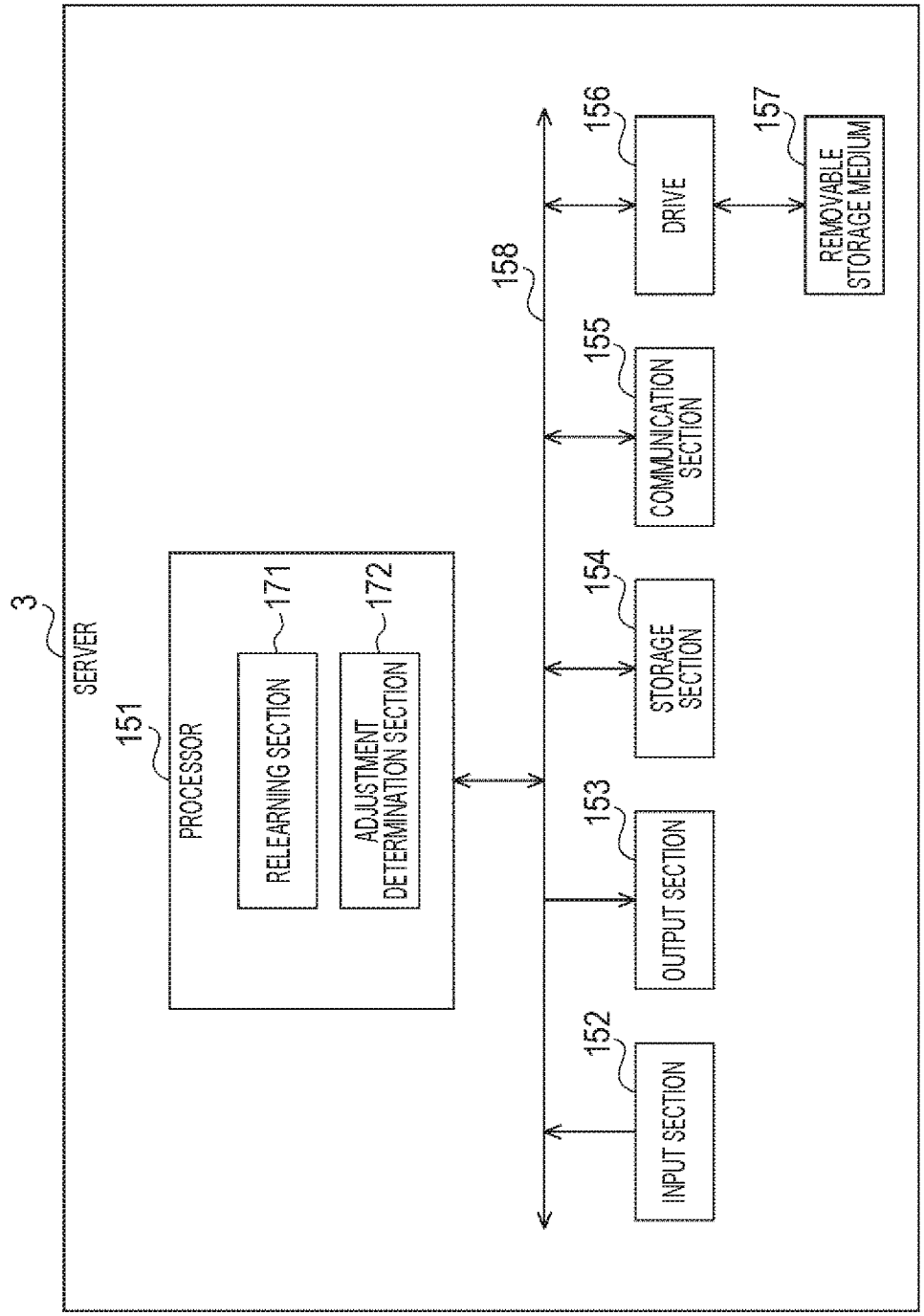
FIG. 6 is a block diagram illustrating a configuration example of a server.

Note that the CPU 1001 in FIG. 17 implements the functions of the processor 21 in FIG. 3, the processor 111 in FIG. 5, and the processor 151 in FIG. 6.

Furthermore, in the present specification, a system means a set of a plurality of components (devices, modules (parts), or the like), and it does not matter whether or not all the components are in the same housing. Therefore, a plurality of devices housed in separate housings and connected via a network and one device in which a plurality of modules is housed in one housing are both systems.

Note that the embodiments of the present disclosure are not limited to the above-described embodiments, and various modifications can be made without departing from the gist of the present disclosure.

For example, the present disclosure can have a configuration of cloud computing in which one function is shared and processed in cooperation by a plurality of devices via a network.

Furthermore, each step described in the above-described flowchart can be executed by one device or can be shared and executed by a plurality of devices.

Moreover, in a case where a plurality of processes is included in one step, the plurality of processes included in the one step can be executed by one device or can be shared and executed by a plurality of devices.

Note that the present disclosure can also have the following configurations.

<1> An information processing apparatus including:
an adjustment content decision section that decides an adjustment content requested by a user of a vehicle regarding update of a software program (SW) of the vehicle; and
an update section that updates the SW on the basis of the adjustment content.

<2> The information processing apparatus according to <1>,
in which the SW is formed by machine learning, and
the adjustment content decision section acquires vehicle accumulation information for updating the SW by relearning, receives an input of a parameter corresponding to the adjustment content requested by the user of the vehicle, the parameter being related to the update of the SW by the relearning, and decides the adjustment content related to the update of the SW by the relearning.

<3> The information processing apparatus according to <2>,
in which the SW is an SW that functions as an object recognition section that executes object recognition processing based on an image formed by the machine learning.

<4> The information processing apparatus according to <3>,
in which the vehicle accumulation information is information including the image and an object recognition processing result of the SW that functions as the corresponding object recognition section.

<5> The information processing apparatus according to <4>,
in which the adjustment content decision section presents an adjustment image indicating a relationship between the parameter and a characteristic obtained by the relearning of the SW that functions as the object recognition section on the basis of the parameter, receives the input of the parameter on the basis of the adjustment image, and decides the adjustment content related to the relearning of the SW.

<6> The information processing apparatus according to <5>,
in which a type of the parameter indicated in the adjustment image is a recognition distance at which the object recognition processing of the object recognition section is possible, and a type of the characteristic obtained by the relearning of the SW that functions as the object recognition section on the basis of the parameter is a possibility of erroneous deceleration based on the object recognition processing result of the object recognition section.

<7> The information processing apparatus according to <5>,
in which a type of the parameter indicated in the adjustment image is recognition sensitivity of the object recognition processing of the object recognition section, and a type of the characteristic obtained by the relearning of the SW that functions as the object recognition section on the basis of the parameter is recognition accuracy of the object recognition processing result of the object recognition section.

<8> The information processing apparatus according to any one of <4> to <7>,
in which the update section updates the SW that functions as the object recognition section in the vehicle on the basis of an adjustment content determination result indicating whether or not the relearning corresponding to the adjustment content decided by the adjustment content decision section has been performed based on a simulation using the SW that functions as the object recognition section relearned.

<9> The information processing apparatus according to <8>,
in which in a case where the adjustment content determination result is a result of determining that the relearning corresponding to the adjustment content decided by the adjustment content decision section has been performed, the update section updates the SW that functions as the object recognition section in the vehicle.

<10> The information processing apparatus according to <8>,
in which in a case where the adjustment content determination result is a result of determining that the relearning corresponding to the adjustment content decided by the adjustment content decision section has not been performed, the update section presents that the update is not possible.

<11> The information processing apparatus according to <8>,
in which in a case where the adjustment content determination result is a result of determining that the relearning corresponding to the adjustment content decided by the adjustment content decision section has not been performed, the adjustment content decision section acquires vehicle accumulation information for relearning the SW again, receives an input of a parameter corresponding to an adjustment content requested by a user of the vehicle, the parameter being related to relearning of the SW, and decides the adjustment content related to the relearning of the SW.

<12> The information processing apparatus according to <8>, further including an adjustment content determination section that determines whether or not the relearning corresponding to the adjustment content decided by the adjustment content decision section has been performed on the SW that functions as the object recognition section relearned on the basis of a simulation, and outputs a result as the adjustment content determination result.

<13> The information processing apparatus according to <8>, in which the SW that functions as the object recognition section is relearned in an external server on the basis of the vehicle accumulation information and the adjustment content.

<14> The information processing apparatus according to <13>, in which the adjustment content determination result is acquired from the external server.

<15> The information processing apparatus according to <13>, in which the external server includes an adjustment content determination section that determines whether or not the relearning corresponding to the adjustment content decided by the adjustment content decision section has been performed on the SW that functions as the object recognition section relearned on the basis of the simulation, and outputs a result as the adjustment content determination result.

<16> The information processing apparatus according to any one of <4> to <15>, in which the vehicle includes another object recognition section different from the SW that functions as the object recognition section, and the SW that functions as the object recognition section is relearned on the basis of an object recognition processing result in an SW that functions as the another object recognition section in addition to the vehicle accumulation information including the image and the object recognition processing result in the SW that functions as the object recognition section, and the adjustment content.

<17> The information processing apparatus according to <16>, further including a recognition performance determination section that determines recognition performance of the object recognition section on the basis of a comparison between the image, the object recognition processing result in the SW that functions as the object recognition section, and the object recognition processing result in the SW that functions as the another object recognition section, in which the SW that functions as the object recognition section is relearned on the basis of the recognition performance determined by the recognition performance determination section, the vehicle accumulation information, and the adjustment content.

<18> An information processing method including the steps of:

deciding an adjustment content requested by a user of a vehicle regarding update of a software program (SW) of the vehicle; and updating the SW on the basis of the adjustment content.

<19> A program causing a computer to function as:

an adjustment content decision section that decides an adjustment content requested by a user of a vehicle regarding update of a software program (SW) of the vehicle; and an update section that updates the SW on the basis of the adjustment content.

<20> An information processing system including:

an adjustment content decision section that decides an adjustment content requested by a user of a vehicle regarding update of a software program (SW) of the vehicle; and an update section that updates the SW on the basis of the adjustment content.

REFERENCE SIGNS LIST

1 Vehicle
2 Data logger
3 Server
21 Processor
22 Communication section
51 Camera
73 Recognition section
Adjustment content decision section
132 Adjustment determination presentation section
133 Update section
Relearning section
172 Adjustment determination section
201 Accumulation processing section
202 Output control section
251 Reception section
252 Transmission section
261 Adjustment determination presentation section
281 Accumulation processing section
282 Output control section
283 Bottom recognition section
284 Recognition performance determination section

The invention claimed is:

1. An information processing apparatus, comprising:
a central processing unit (CPU) configured to:
output an adjustment image to a display device;
receive an input of a first parameter from a user based on the adjustment image;
decide a first adjustment content requested by the user, wherein:
the first adjustment content is requested by the user based on the input of the first parameter received from the user, and
the first adjustment content is related to an update of a first software program (SW) of a vehicle; and
update the first SW of the vehicle based on the first adjustment content, wherein:
the adjustment image indicates a relationship between the first parameter that corresponds to the first adjustment content and a characteristic of the first SW of the vehicle updated based on the first parameter.

2. The information processing apparatus according to claim 1, wherein:
the first SW of the vehicle is generated based on machine learning, and
the CPU is further configured to:
acquire a first vehicle accumulation information for the update of the first SW of the vehicle based on a relearning operation;
receive the first parameter that corresponds to the first adjustment content requested by the user, wherein the first parameter is related to the update of the first SW of the vehicle based on the relearning operation; and decide the first adjustment content related to the update of the first SW of the vehicle based on the relearning operation.

3. The information processing apparatus according to claim 2, wherein:

the first SW of the vehicle functions as a first object recognition section, and the first object recognition section is configured to execute an object recognition process based on an image generated based on the machine learning.

4. The information processing apparatus according to claim 3, wherein:

the first vehicle accumulation information includes the image and a first object recognition process result of the first SW of the vehicle that functions as the first object recognition section.

5. The information processing apparatus according to claim 4, wherein:

a type of the first parameter indicated in the adjustment image is a recognition distance at which the object recognition process of the first object recognition section is possible, a type of the characteristic of the first SW of the vehicle obtained based on the relearning operation of the first SW of the vehicle is a possibility of an erroneous deceleration, and the possibility of the erroneous deceleration is based on the first object recognition process result of the first SW of the vehicle that functions as the first object recognition section.

6. The information processing apparatus according to claim 4, wherein:

a type of the first parameter indicated in the adjustment image is a recognition sensitivity of the object recognition process of the first object recognition section, and a type of the characteristic of the first SW of the vehicle obtained based on the relearning operation of the first SW of the vehicle is a recognition accuracy of the first object recognition process result of the first SW of the vehicle that functions as the first object recognition section.

7. The information processing apparatus according to claim 4, wherein the CPU is further configured to:

update the first SW of the vehicle that functions as the first object recognition section based on an adjustment content determination result that indicates whether the relearning operation of the first SW of the vehicle that corresponds to the first adjustment content has been performed, wherein the indication of whether the relearning operation of the first SW of the vehicle that corresponds to the first adjustment content has been performed is based on a simulation that uses a relearned first SW of the vehicle that functions as the first object recognition section.

8. The information processing apparatus according to claim 7, wherein, based on the adjustment content determination result that indicates that the relearning operation of the first SW of the vehicle that corresponds to the first adjustment content has been performed, the CPU is further configured to:

update the first SW of the vehicle that functions as the first object recognition section.

9. The information processing apparatus according to claim 7, wherein, based on the adjustment content determination result that indicates that the relearning operation of the first SW of the vehicle that corresponds to the first adjustment content has not been performed, the CPU is further configured to:

present that the update of the first SW of the vehicle is not possible.

10. The information processing apparatus according to claim 7, wherein, based on the adjustment content determination result that indicates that the relearning operation of the first SW of the vehicle that corresponds to the first adjustment content has not been performed, the CPU is further configured to:

acquire a second vehicle accumulation information for the relearning operation of the first SW of the vehicle again;

receive a second parameter that corresponds to the first adjustment content requested by the user, wherein the second parameter is related to the relearning operation of the first SW of the vehicle; and decide a second adjustment content related to the relearning operation of the first SW of the vehicle.

11. The information processing apparatus according to claim 7, wherein the CPU is further configured to:

determine whether the relearning operation of the first SW of the vehicle that corresponds to the first adjustment content has been performed on the first SW of the vehicle that functions as the first object recognition section, wherein the determination whether the relearning operation of the first SW of the vehicle that corresponds to the first adjustment content has been performed is based on the simulation; and output a result of the determination as the adjustment content determination result.

12. The information processing apparatus according to claim 7, wherein:

the first SW of the vehicle that functions as the first object recognition section is relearned in an external server based on the first vehicle accumulation information and the first adjustment content.

13. The information processing apparatus according to claim 12, wherein the CPU is further configured to:

acquire the adjustment content determination result from the external server.

14. The information processing apparatus according to claim 12, wherein the external server includes a processor configured to:

determine whether the relearning operation of the first SW of the vehicle that corresponds to the first adjustment content has been performed on the first SW of the vehicle that functions as the first object recognition section, wherein the determination whether the relearning operation of the first SW of the vehicle that corresponds to the first adjustment content has been performed is based on the simulation; and output a result of the determination as the adjustment content determination result.

15. The information processing apparatus according to claim 4, wherein:

the vehicle includes a second object recognition section different from the first SW of the vehicle that functions as the first object recognition section, the first SW of the vehicle that functions as the first object recognition section is relearned based on a second object recognition process result of a second SW of the vehicle that functions as the second object recognition section, the first vehicle accumulation information, and the first adjustment content, and the first vehicle accumulation information includes the image and the first object recognition process result of the first SW of the vehicle that functions as the first object recognition section.

16. The information processing apparatus according to claim 15, wherein the CPU is further configured to:

determine recognition performance of the first object recognition section based on a comparison between the image, the first object recognition process result of the first SW of the vehicle that functions as the first object recognition section, and the second object recognition process result of the second SW of the vehicle that functions as the second object recognition section, wherein the first SW of the vehicle that functions as the first object recognition section is relearned based on the recognition performance of the first object recognition section, the first vehicle accumulation information, and the first adjustment content.

17. The information processing apparatus according to claim 1, wherein:

the input of the first parameter is the first parameter that corresponds to the first adjustment content requested by the user, and the input of the first parameter is based on the adjustment image.

18. An information processing method, comprising:

outputting an adjustment image to a display device;

receiving an input of a parameter from a user based on the adjustment image;

deciding an adjustment content requested by the user, wherein:

the adjustment content is requested by the user based on the input of the parameter received from the user, and the adjustment content is related to an update of a software program (SW) of a vehicle; and updating the SW of the vehicle based on the adjustment content, wherein:

the adjustment image indicates a relationship between the parameter that corresponds to the adjustment content and a characteristic of the SW of the vehicle updated based on the parameter.

19. A non-transitory computer-readable storage medium having stored thereon computer-executable instructions that, when executed by a computer, cause the computer to execute operations, the operations comprising:

outputting an adjustment image to a display device;

receiving an input of a parameter from a user based on the adjustment image;

deciding an adjustment content requested by the user, wherein:

the adjustment content is requested by the user based on the input of the parameter received from the user, and the adjustment content is related to an update of a software program (SW) of a vehicle; and updating the SW of the vehicle based on the adjustment content, wherein:

the adjustment image indicates a relationship between the parameter that corresponds to the adjustment content and a characteristic of the SW of the vehicle updated based on the parameter.

20. An information processing system, comprising:

a central processing unit (CPU) configured to:

output an adjustment image to a display device;

receive an input of a parameter from a user based on the adjustment image;

decide an adjustment content requested by the user, wherein:

the adjustment content is requested by the user based on the input of the parameter received from the user, and the adjustment content is related to an update of a software program (SW) of a vehicle; and update the SW of the vehicle based on the adjustment content, wherein:

the adjustment image indicates a relationship between the parameter that corresponds to the adjustment content and a characteristic of the SW of the vehicle updated based on the parameter.

* * * * *